United States Patent [19]

Stoel et al.

[11] Patent Number: 5,905,942
[45] Date of Patent: May 18, 1999

[54] MULTIPLE DWELLING UNIT INTERACTIVE AUDIO/VIDEO DISTRIBUTION SYSTEM

[75] Inventors: Leon P. Stoel, Sioux Falls, S. Dak.; Vernon E. Hills, Sunnyvale, Calif.; David M. Bankers; Douglas D. Truckenmiller, both of Sioux Falls, S. Dak.

[73] Assignee: LodgeNet Entertainment Corporation, Sioux Falls, S. Dak.

[21] Appl. No.: 08/801,476

[22] Filed: Feb. 18, 1997

[51] Int. Cl.$^6$ ........................................................ H04N 7/10
[52] U.S. Cl. .............................. 455/4.2; 455/6.1; 348/12; 348/7
[58] Field of Search .................................. 348/6, 12, 13, 348/7, 5.5; 455/3.1, 4.2, 5.1, 6.1; 395/200.47, 200.49

[56] References Cited

U.S. PATENT DOCUMENTS

| | | | |
|---|---|---|---|
| Re. 34,611 | 5/1994 | Fenwick et al. | 348/7 |
| 3,654,708 | 4/1972 | Brudner | 434/307 R |
| 3,833,765 | 9/1974 | Hilborn et al. | 178/79 |
| 3,952,298 | 4/1976 | Wickelmann et al. | 340/347 |
| 3,975,585 | 8/1976 | Kirk, Jr. et al. | 178/5.1 |
| 4,057,829 | 11/1977 | Moorehead | 358/86 |
| 4,110,794 | 8/1978 | Lester et al. | 358/256 |
| 4,360,828 | 11/1982 | Briggs, Jr. et al. | 358/86 |
| 4,363,482 | 12/1982 | Goldfarb | 273/1 |
| 4,450,481 | 5/1984 | Dickinson | 358/114 |
| 4,484,218 | 11/1984 | Boland et al. | 358/86 |
| 4,494,197 | 1/1985 | Troy et al. | 364/412 |
| 4,584,603 | 4/1986 | Harrison | 358/86 |
| 4,647,980 | 3/1987 | Steventon et al. | 358/254 |
| 4,738,451 | 4/1988 | Logg | 273/153 |
| 4,747,043 | 5/1988 | Rodman | 364/200 |
| 4,792,971 | 12/1988 | Uemura | 380/7 |
| 4,829,372 | 5/1989 | McCalley et al. | 358/86 |
| 4,866,515 | 9/1989 | Tagawa et al. | 358/86 |
| 4,912,760 | 3/1990 | West, Jr. et al. | 380/7 |
| 4,920,432 | 4/1990 | Eggers et al. | 360/33.1 |
| 4,922,420 | 5/1990 | Nakagawa et al. | 364/410 |
| 4,926,327 | 5/1990 | Sidley | 364/412 |
| 4,965,568 | 10/1990 | Atalla et al. | 340/825.34 |
| 4,994,909 | 2/1991 | Graves et al. | 358/86 |
| 5,014,125 | 5/1991 | Pocock et al. | 358/86 |
| 5,093,718 | 3/1992 | Hoarty et al. | 358/84 |

(List continued on next page.)

FOREIGN PATENT DOCUMENTS

| | | |
|---|---|---|
| 268419 A3 | 11/1987 | European Pat. Off. . |
| 277014 A2 | 1/1988 | European Pat. Off. . |
| 542664 A2 | 11/1992 | European Pat. Off. . |
| 631247 A2 | 6/1994 | European Pat. Off. . |
| 647914 A2 | 9/1994 | European Pat. Off. . |
| 213490 | 1/1990 | Japan . |
| 2213374 | 8/1990 | Japan . |
| 2151054 | 10/1993 | Japan . |
| WO 81/01664 | 12/1980 | WIPO . |

Primary Examiner—Victor R. Kostak
Attorney, Agent, or Firm—Sheridan Ross P.C.

[57] ABSTRACT

An audio/video distribution system for a multiple dwelling unit such as an apartment building provides programming which is selectable by a subscriber through the interactive use of on-screen menus. Programming and services are supplied from a headend over a distribution network to individual apartments. The distribution network includes an interdiction field unit associated with each of a group of apartments. The interdiction field unit normally interdicts those channels capable of carrying video on demand movies, interactive video games, and interactive services. When a subscriber wishes to order a movie, video game, or other service through interactive on-screen menus provided from the headend to the apartment, the headend instructs the interdiction field unit associated with the subscriber's apartment to de-interdict a channel. Selections made through a remote control to a subscriber terminal in the apartment are supplied to the headend over the distribution system. The channel remains deinterdicted during the playing of a movie, video game, or interactive service selected by the subscriber, based upon the signals received from the subscriber terminal during the interactive on-screen menu session.

24 Claims, 18 Drawing Sheets

U.S. PATENT DOCUMENTS

| | | | |
|---|---|---|---|
| 5,130,792 | 7/1992 | Tindell et al. | 358/85 |
| 5,132,992 | 7/1992 | Yurt et al. | 375/122 |
| 5,144,663 | 9/1992 | Kudelski et al. | 380/16 |
| 5,168,353 | 12/1992 | Walker et al. | 358/86 |
| 5,181,107 | 1/1993 | Rhoades | 358/86 |
| 5,182,640 | 1/1993 | Takano | 358/86 |
| 5,193,208 | 3/1993 | Yokota et al. | 455/4.1 |
| 5,206,722 | 4/1993 | Kwan | 358/86 |
| 5,218,552 | 6/1993 | Stirk et al. | 364/492 |
| 5,231,485 | 7/1993 | Israelsen et al. | 358/133 |
| 5,233,652 | 8/1993 | Huang et al. | 380/7 |
| 5,245,420 | 9/1993 | Harney et al. | 358/86 |
| 5,247,348 | 9/1993 | Israelsen et al. | 358/86 |
| 5,253,275 | 10/1993 | Yurt et al. | 375/122 |
| 5,253,940 | 10/1993 | Abecassis | 400/495 |
| 5,255,090 | 10/1993 | Israelsen | 358/133 |
| 5,267,032 | 11/1993 | Van Cang | 358/86 |
| 5,287,539 | 2/1994 | West, Jr. | 455/1 |
| 5,289,272 | 2/1994 | Rabowsky et al. | 348/8 |
| 5,294,981 | 3/1994 | Yazolino et al. | 348/4 |
| 5,297,144 | 3/1994 | Gilbert et al. | 370/95.2 |
| 5,311,302 | 5/1994 | Berry et al. | 348/14 |
| 5,311,325 | 5/1994 | Edwards et al. | 348/5.5 |
| 5,311,423 | 5/1994 | Clark | 364/401 |
| 5,329,370 | 7/1994 | Yazolino et al. | 548/734 |
| 5,339,315 | 8/1994 | Maeda et al. | 370/85.1 |
| 5,341,258 | 8/1994 | Chalmers et al. | 360/92 |
| 5,345,504 | 9/1994 | West, Jr. | 380/7 |
| 5,355,162 | 10/1994 | Yazolino et al. | 348/11 |
| 5,367,330 | 11/1994 | Haave et al. | 348/7 |
| 5,383,112 | 1/1995 | Clark | 364/401 |
| 5,389,963 | 2/1995 | Lepley et al. | 348/7 |
| 5,396,546 | 3/1995 | Remillard | 379/96 |
| 5,404,393 | 4/1995 | Remillard | 379/96 |
| 5,410,343 | 4/1995 | Coddington et al. | 348/7 |
| 5,412,720 | 5/1995 | Hoarty | 380/15 |
| 5,414,456 | 5/1995 | Oda et al. | 348/10 |
| 5,416,508 | 5/1995 | Sakuma et al. | 348/3 |
| 5,427,489 | 6/1995 | Chalmers et al. | 414/277 |
| 5,434,678 | 7/1995 | Abecassis | 358/342 |
| 5,434,832 | 7/1995 | Beal et al. | 369/36 |
| 5,446,490 | 8/1995 | Blahut et al. | 348/7 |
| 5,453,779 | 9/1995 | Dan et al. | 348/7 |
| 5,459,506 | 10/1995 | Bushnell | 348/7 |
| 5,461,415 | 10/1995 | Wolf et al. | 348/7 |
| 5,465,384 | 11/1995 | Bejan et al. | 455/2 |
| 5,467,397 | 11/1995 | West et al. | 380/7 |
| 5,477,262 | 12/1995 | Banker et al. | 348/7 |
| 5,477,263 | 12/1995 | O'Callaghan et al. | 348/7 |
| 5,481,542 | 1/1996 | Logston et al. | 370/94 |
| 5,485,197 | 1/1996 | Hoarty | 348/7 |
| 5,497,187 | 3/1996 | Banker et al. | 348/6 |
| 5,499,048 | 3/1996 | Seo | 348/10 |
| 5,500,794 | 3/1996 | Fujita et al. | 364/188 |
| 5,505,901 | 4/1996 | Harney et al. | 348/10 |
| 5,513,180 | 4/1996 | Miyake et al. | 370/60.1 |
| 5,519,435 | 5/1996 | Anderson | 348/8 |
| 5,521,631 | 5/1996 | Budow et al. | 348/7 |
| 5,523,781 | 6/1996 | Brusaw | 348/3 |
| 5,524,195 | 6/1996 | Clanton, III et al. | 395/155 |
| 5,526,034 | 6/1996 | Hoarty et al. | 348/7 |
| 5,528,283 | 6/1996 | Burton | 348/13 |
| 5,550,578 | 8/1996 | Hoarty et al. | 348/7 |
| 5,550,863 | 8/1996 | Yurt et al. | 375/240 |
| 5,553,311 | 9/1996 | McLaughlin et al. | 395/884 |
| 5,557,316 | 9/1996 | Hoarty et al. | 348/7 |
| 5,559,549 | 9/1996 | Hendricks et al. | 348/6 |
| 5,565,908 | 10/1996 | Ahmad | 348/7 |
| 5,568,180 | 10/1996 | Okamoto | 348/7 |
| 5,581,270 | 12/1996 | Smith et al. | 345/2 |
| 5,587,734 | 12/1996 | Lauder et al. | 348/10 |
| 5,589,945 | 12/1996 | Abecassis | 386/83 |
| 5,592,540 | 1/1997 | Beveridge | 379/184 |
| 5,592,551 | 1/1997 | Lett et al. | 380/20 |
| 5,594,492 | 1/1997 | O'Callaghan et al. | 348/10 |
| 5,594,507 | 1/1997 | Hoarty | 348/584 |
| 5,596,348 | 1/1997 | Hayakawa | 345/146 |
| 5,604,528 | 2/1997 | Edwards et al. | 348/5.5 |
| 5,610,653 | 3/1997 | Abecassis | 348/110 |
| 5,619,249 | 4/1997 | Billock et al. | 348/7 |
| 5,625,404 | 4/1997 | Grady et al. | 348/7 |
| 5,625,864 | 4/1997 | Budow et al. | 455/4.2 |
| 5,677,095 | 10/1997 | Bigham et al. | 455/4.2 |
| 5,682,195 | 10/1997 | Hendricks et al. | 348/6 |

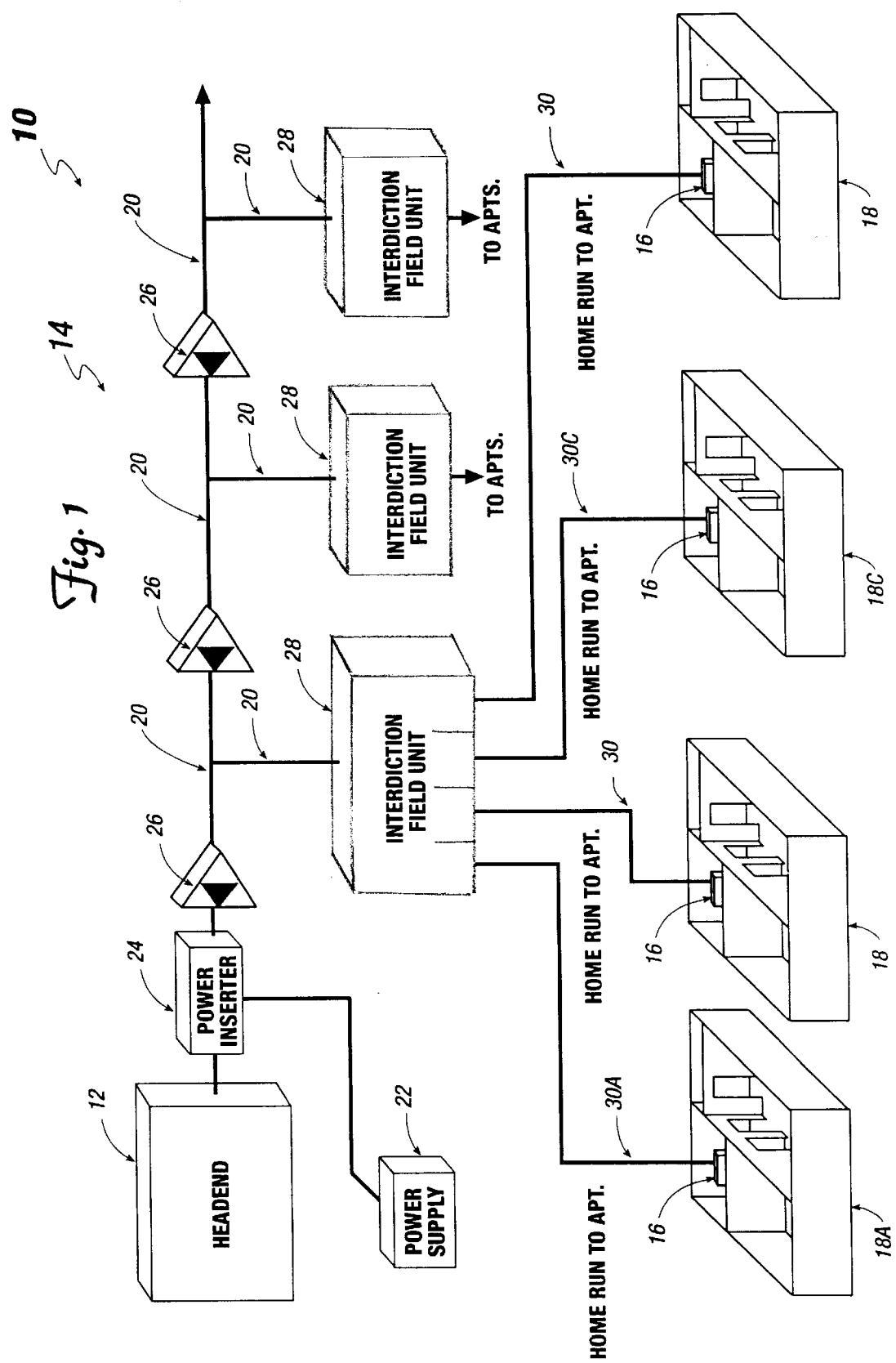

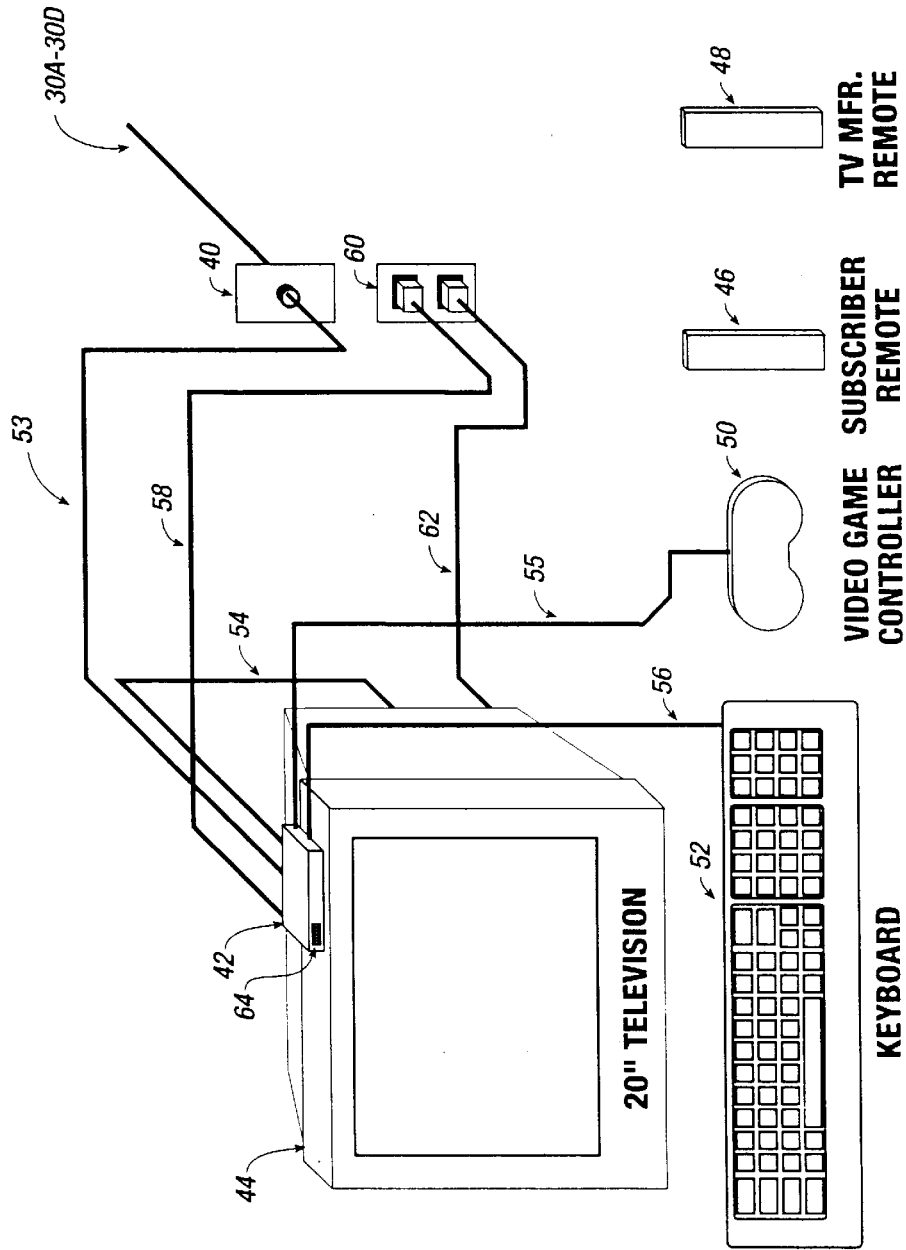

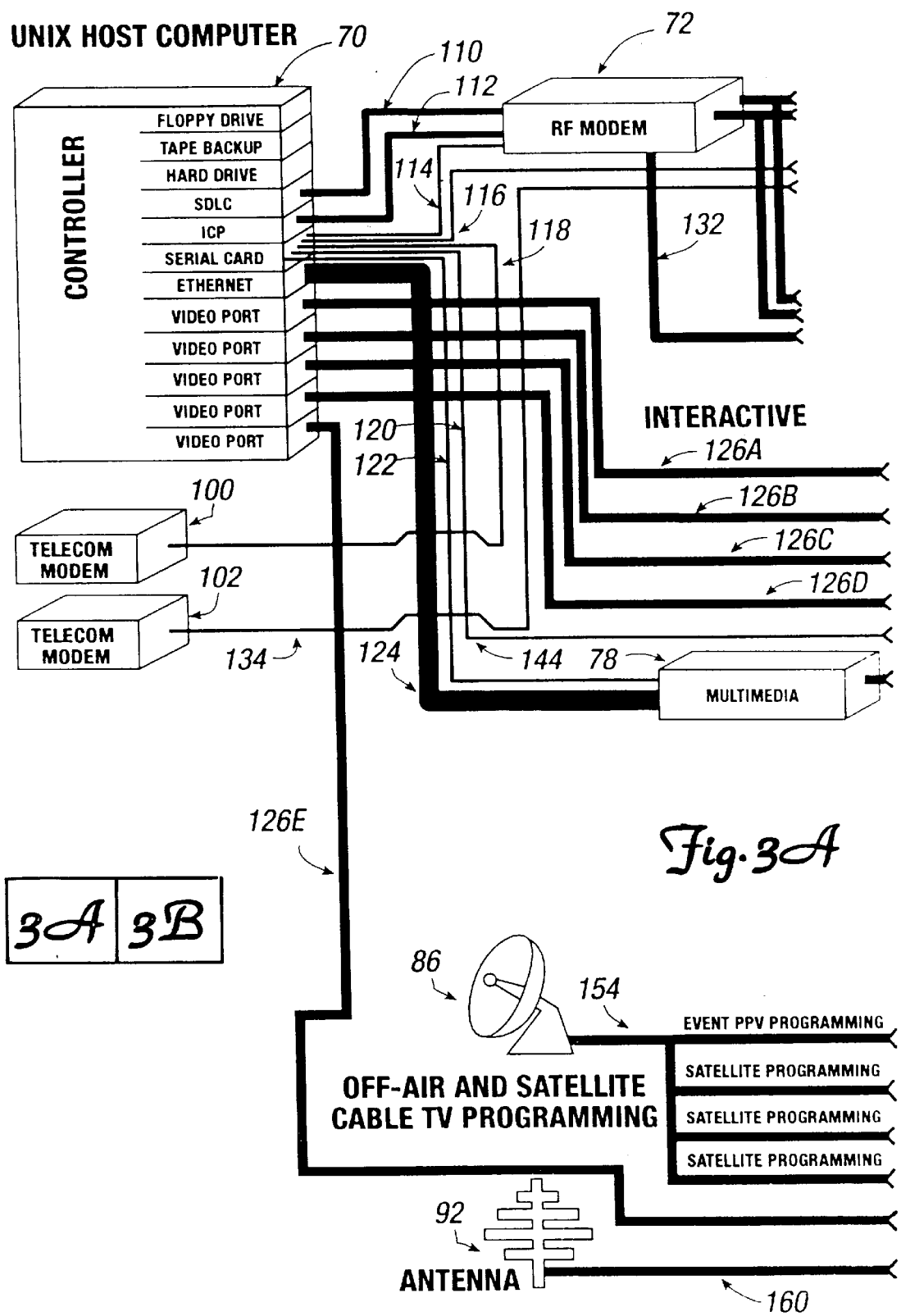

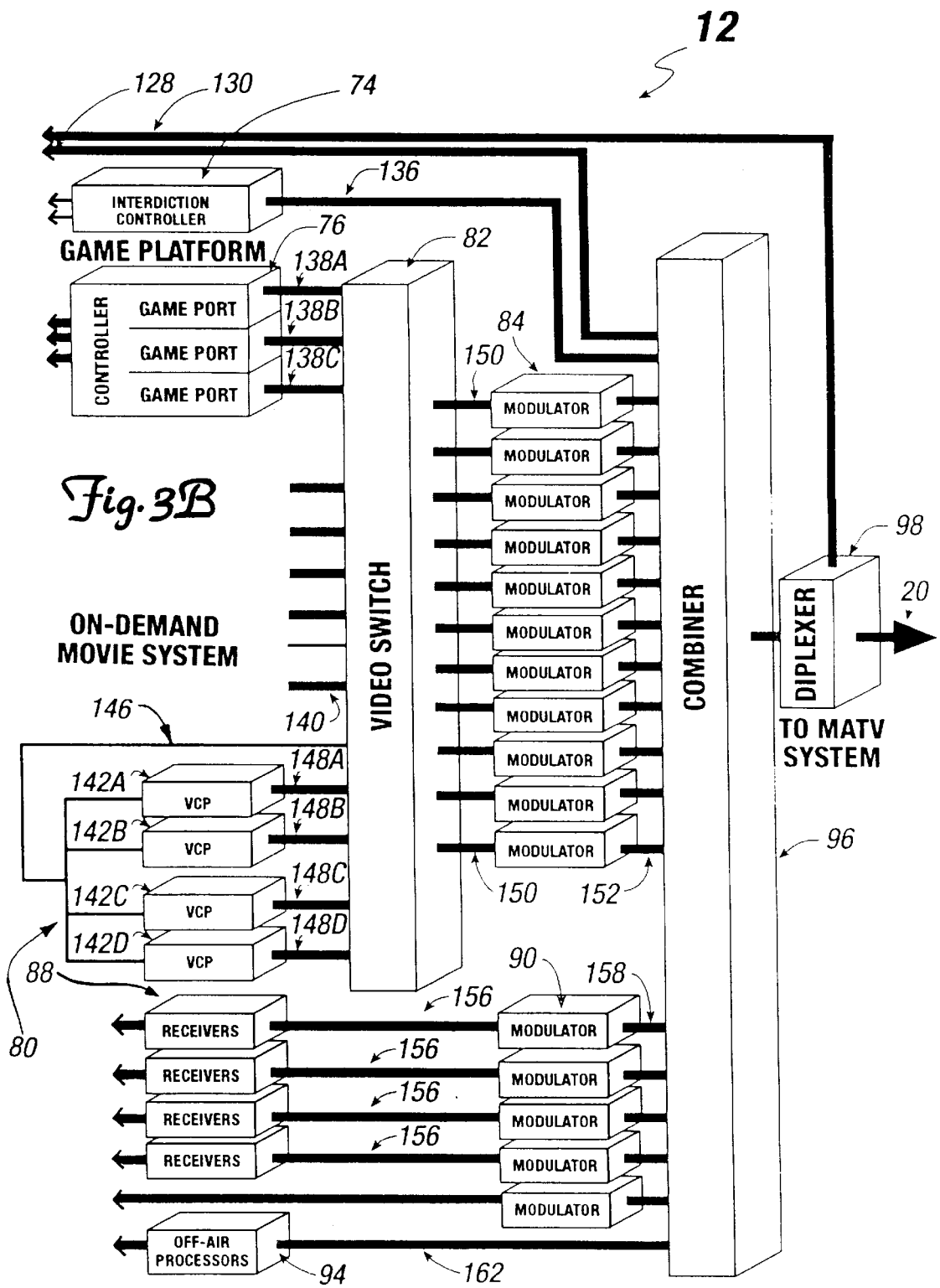

MDU SYSTEM FLOW CHART
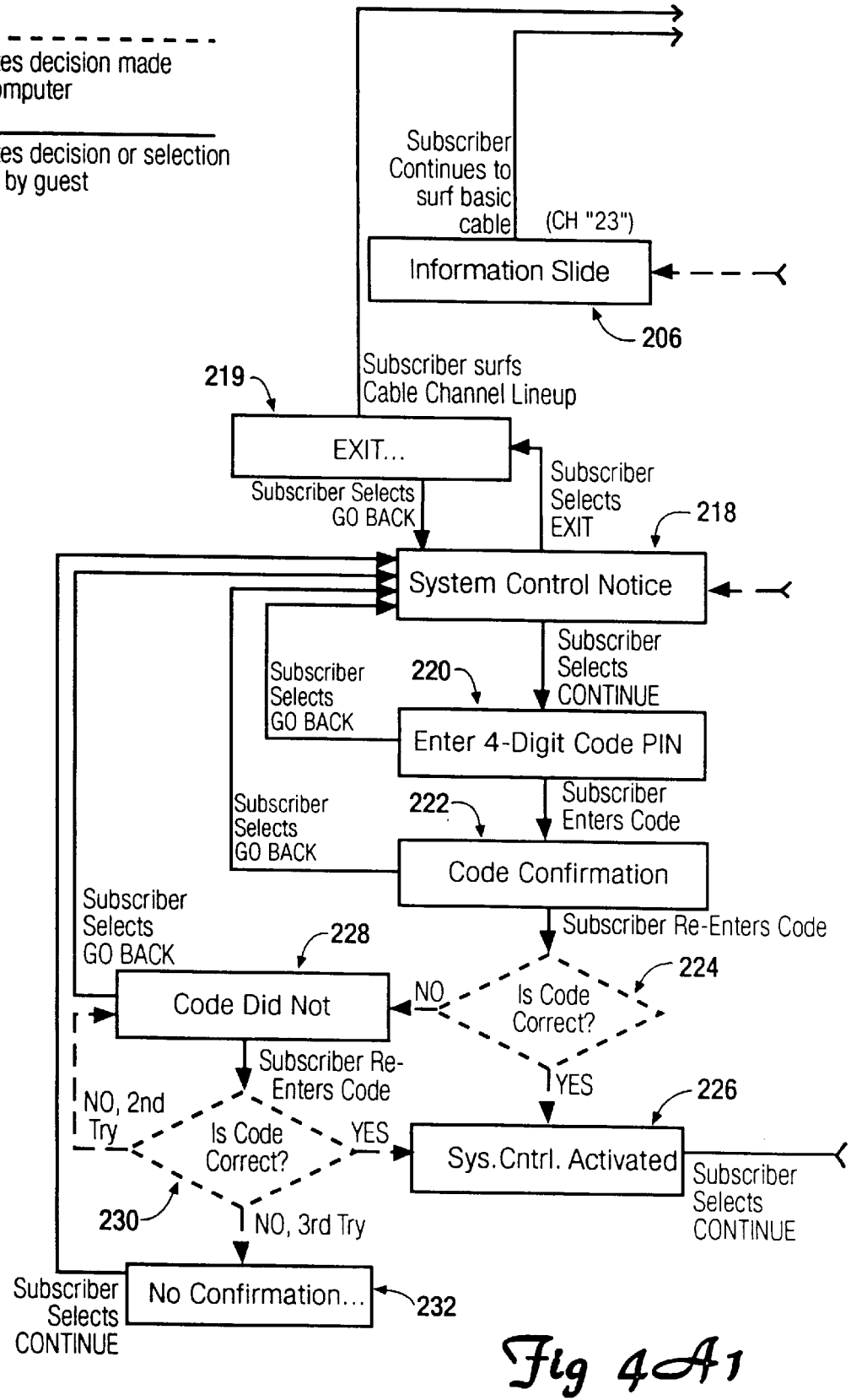
Fig 4A1

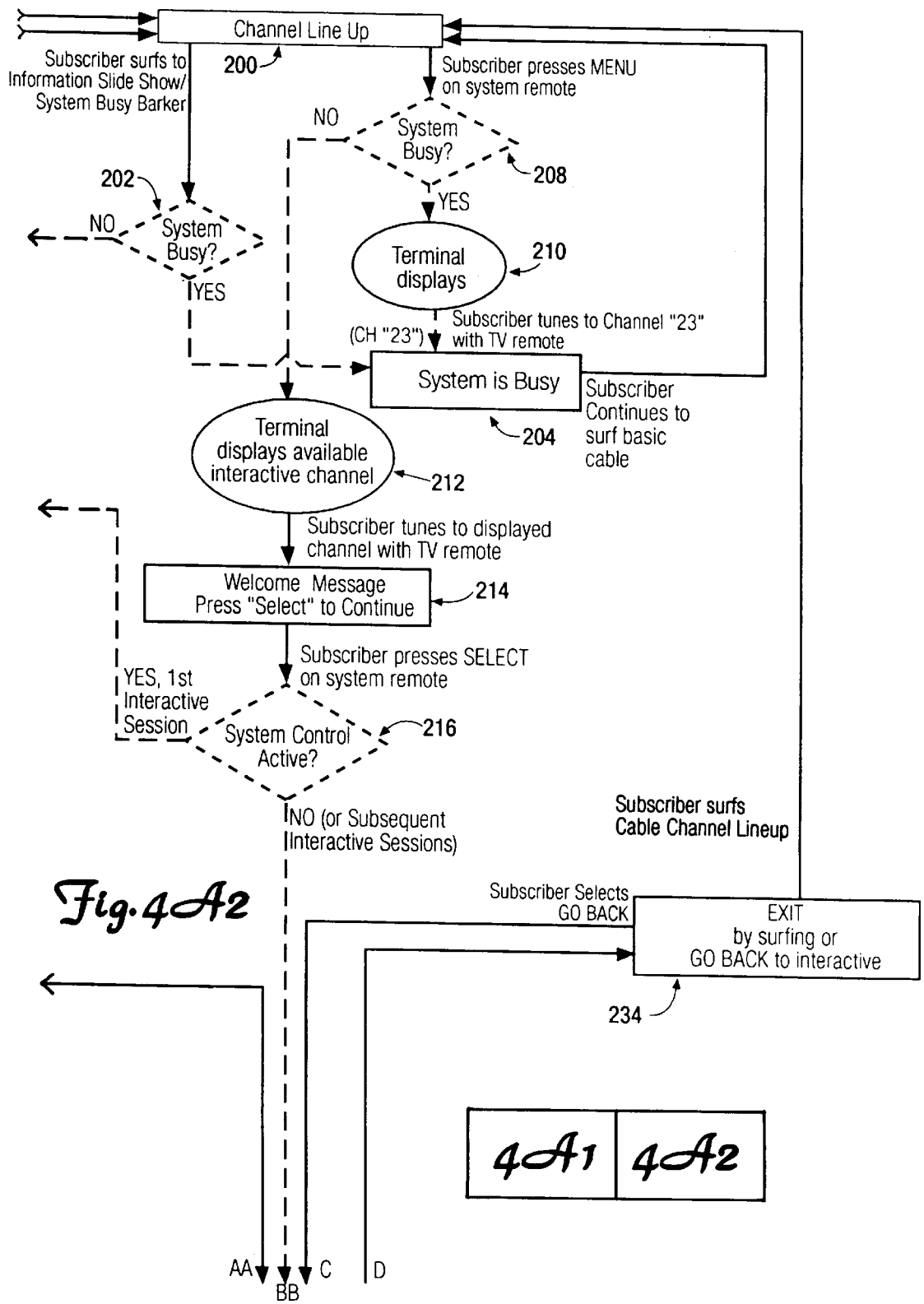
Fig. 4A2

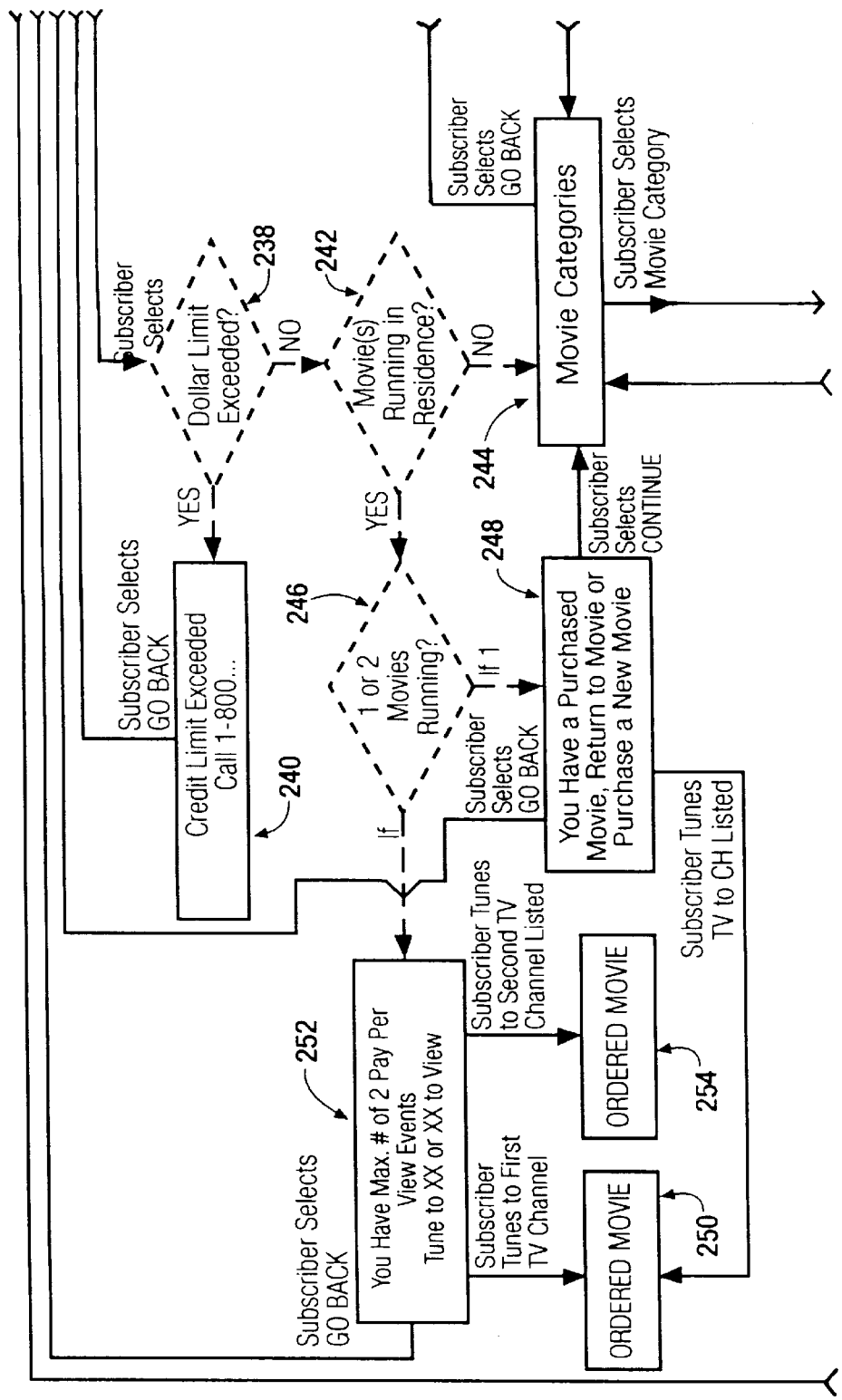
Fig 4B1

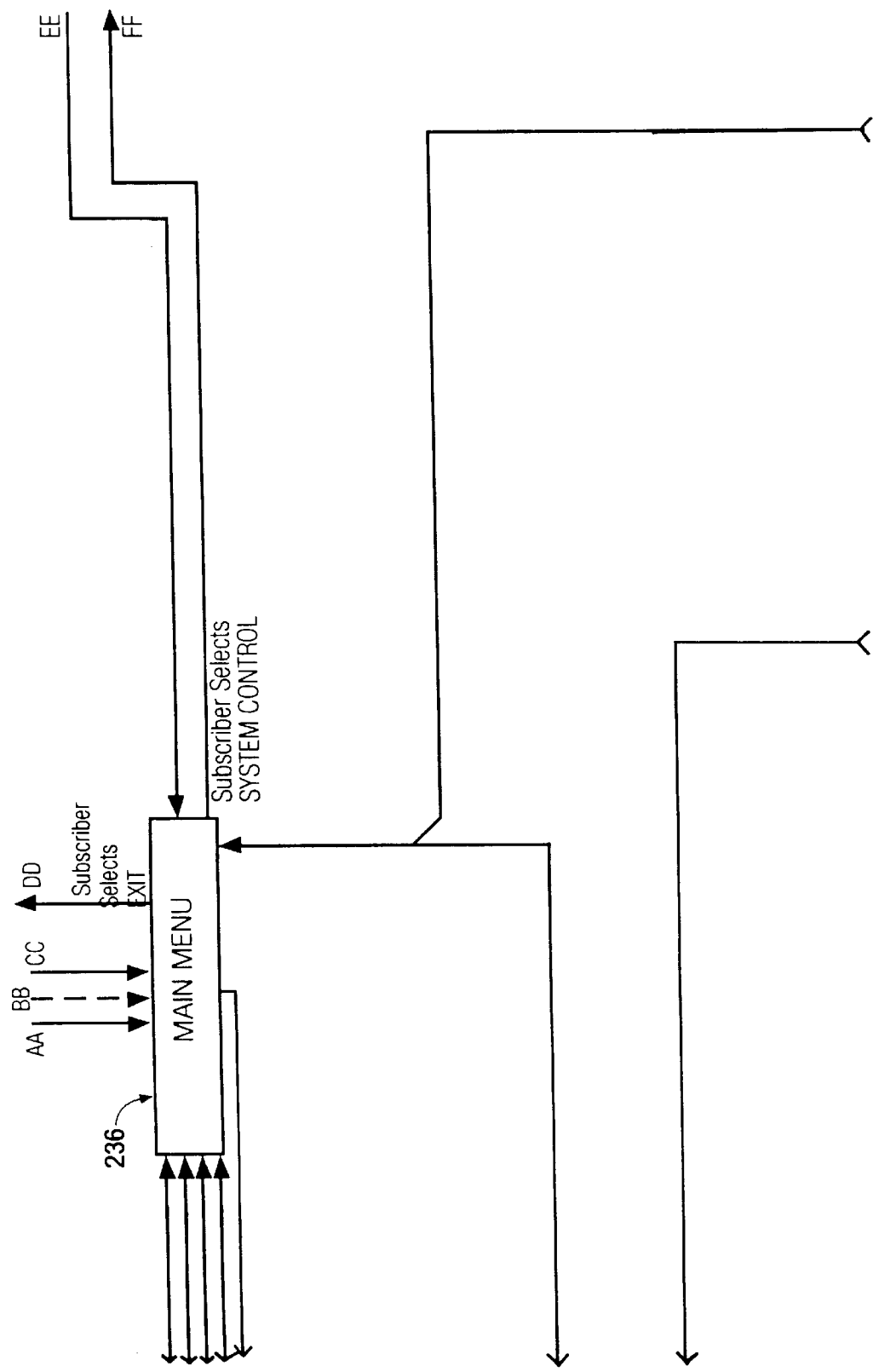

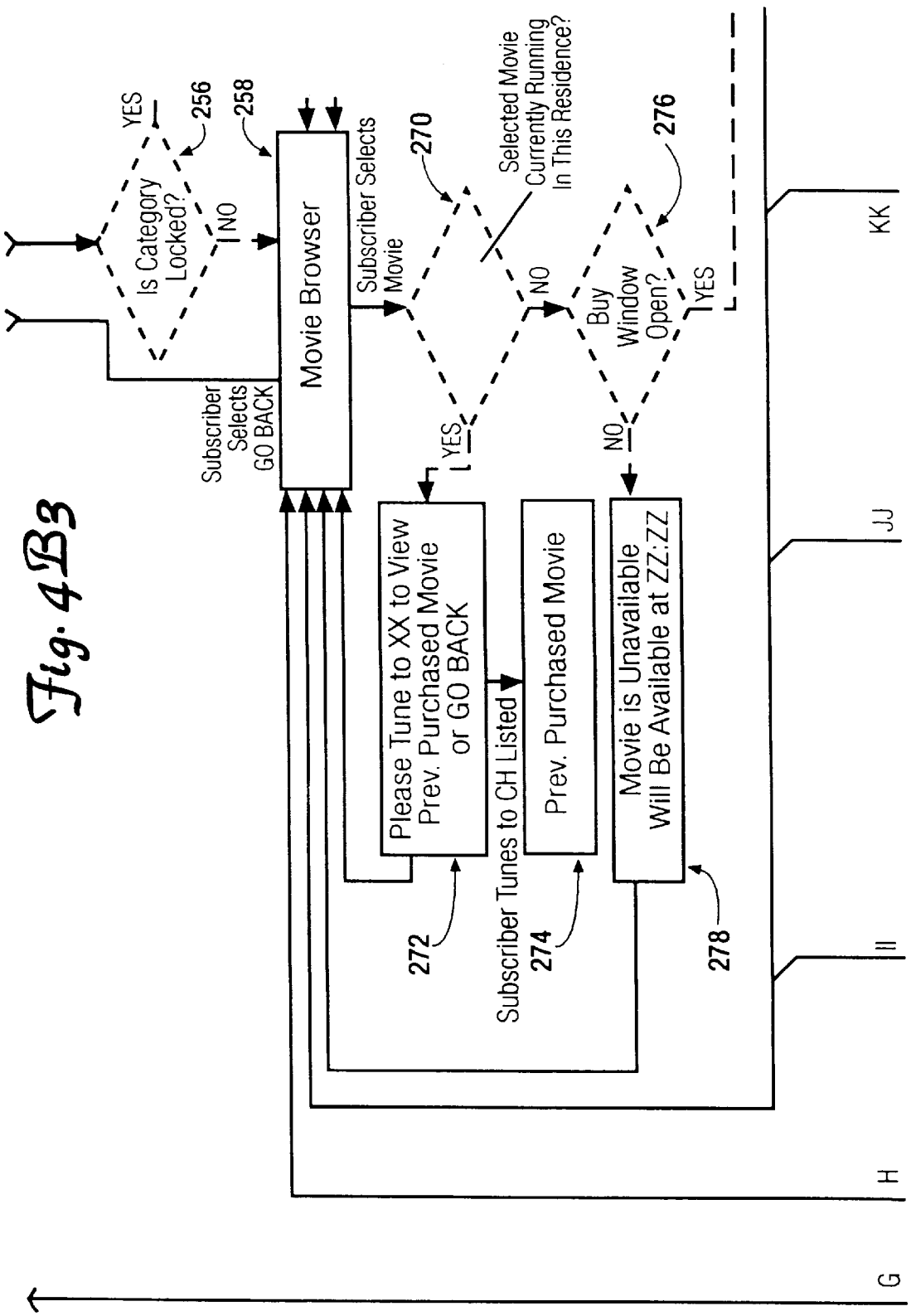

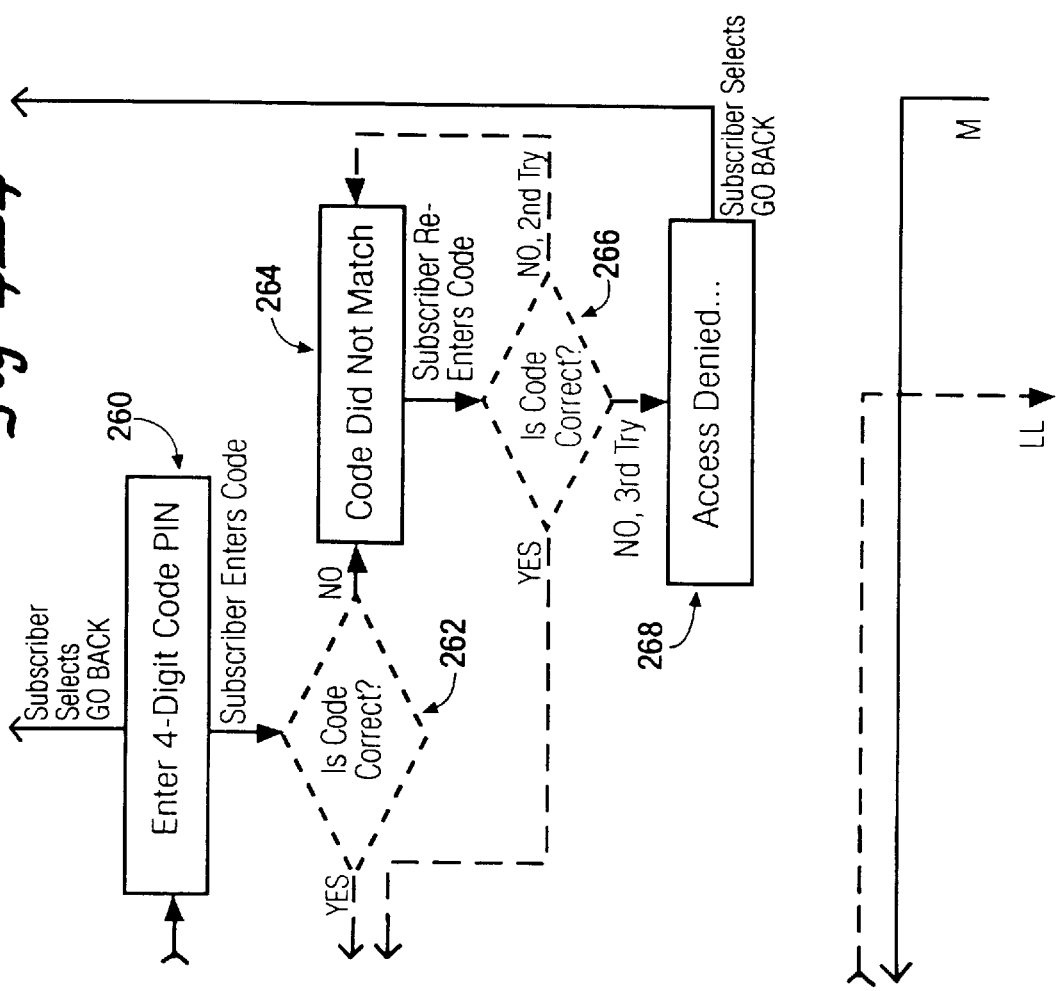

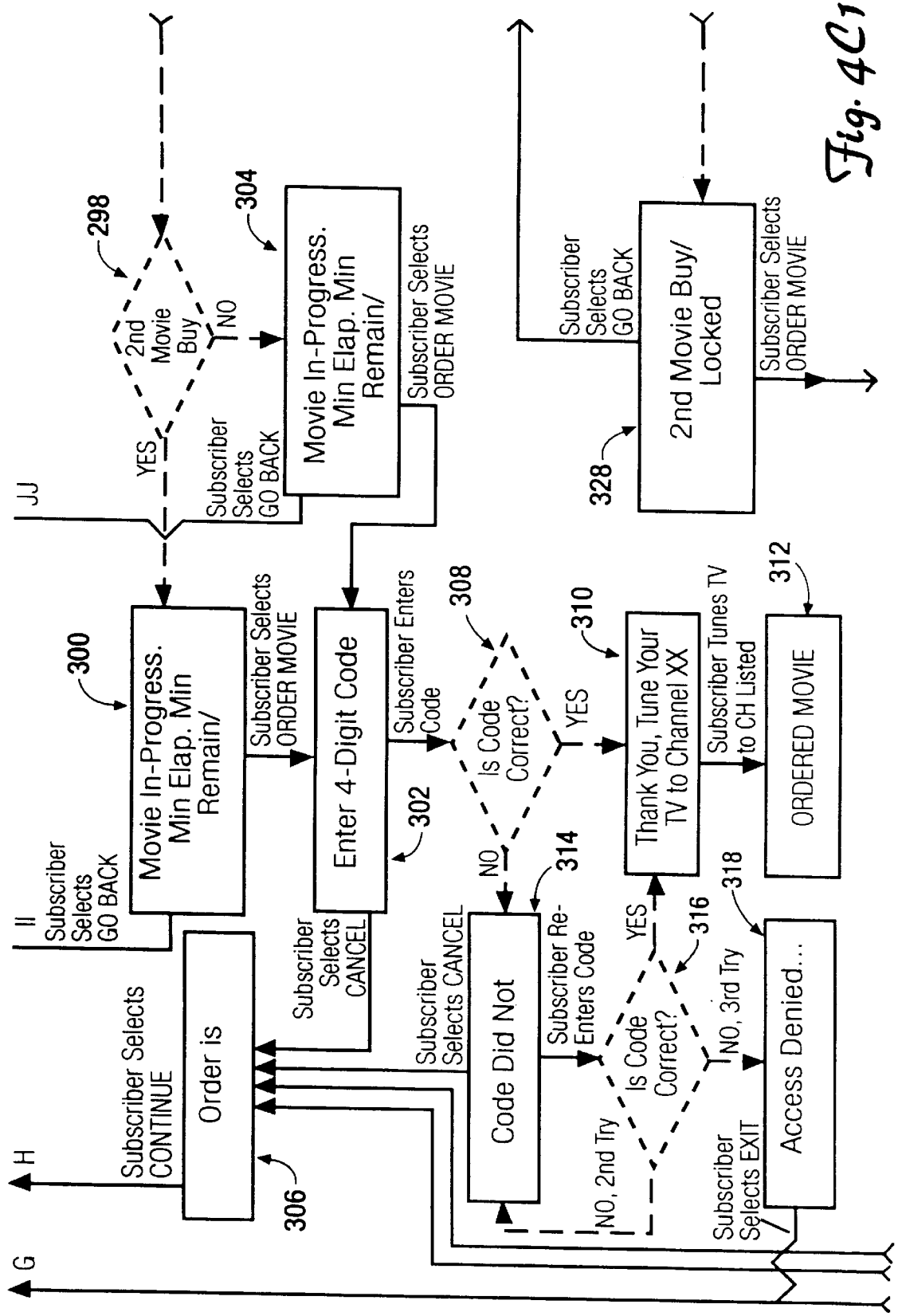
Fig. 4C1

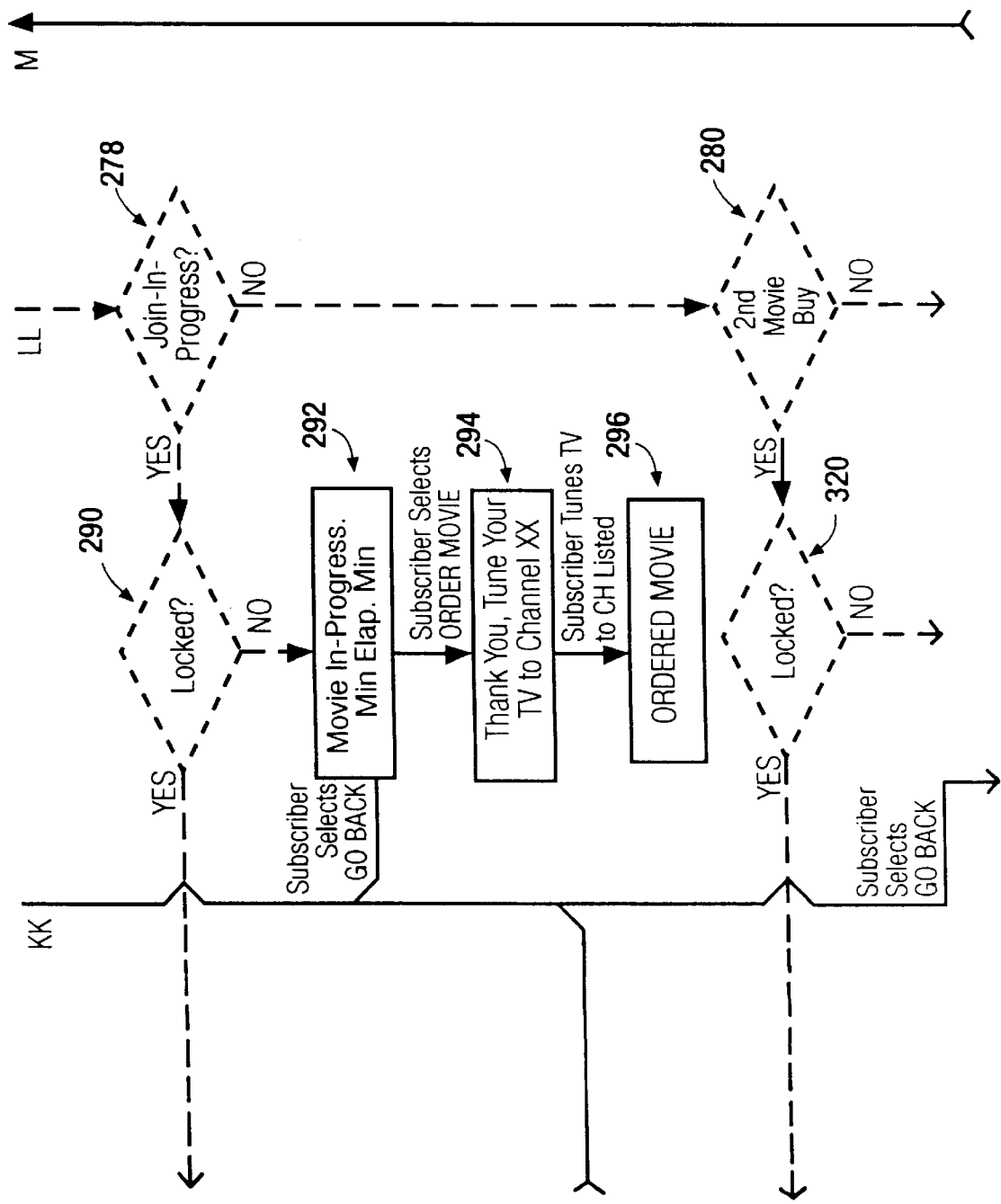

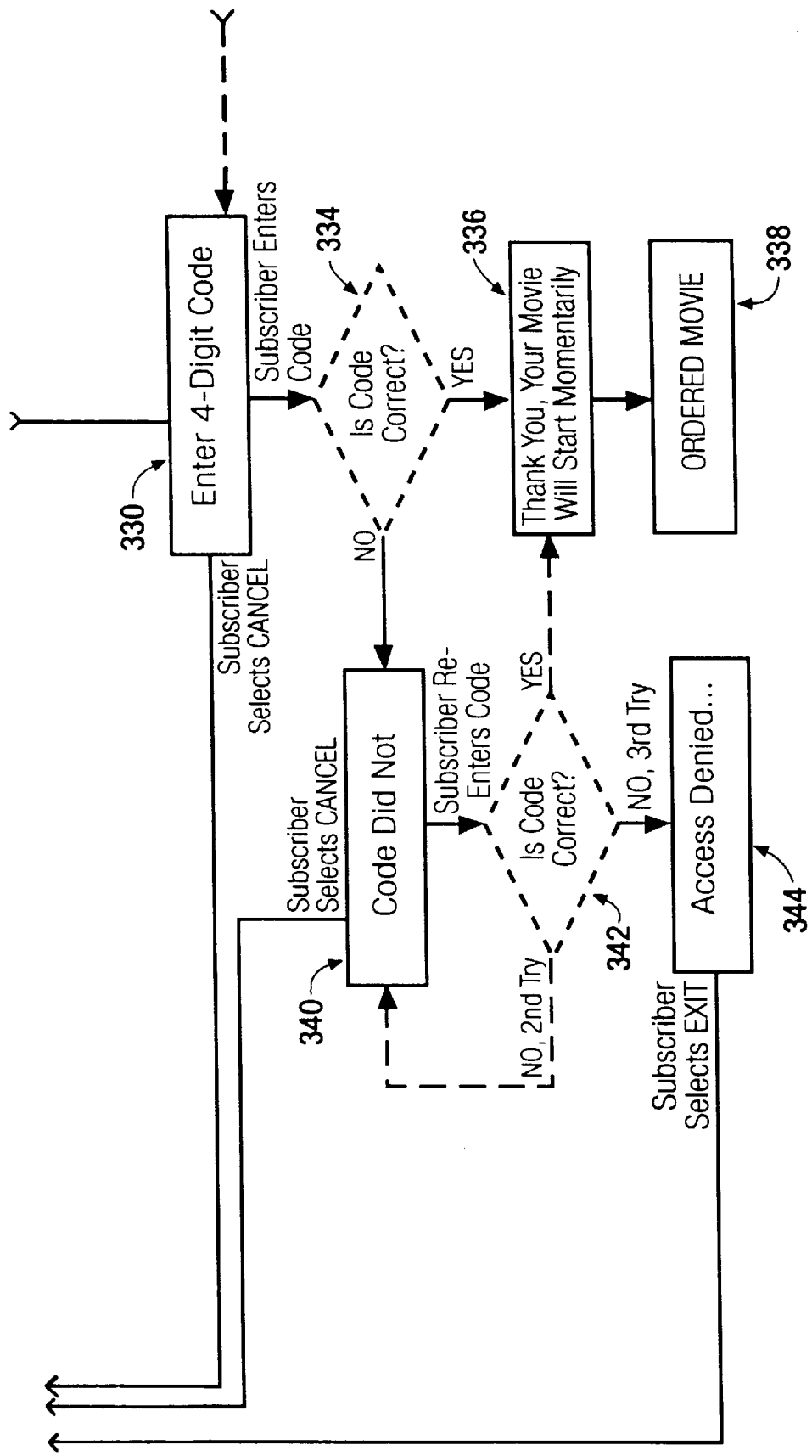
Fig 4C3

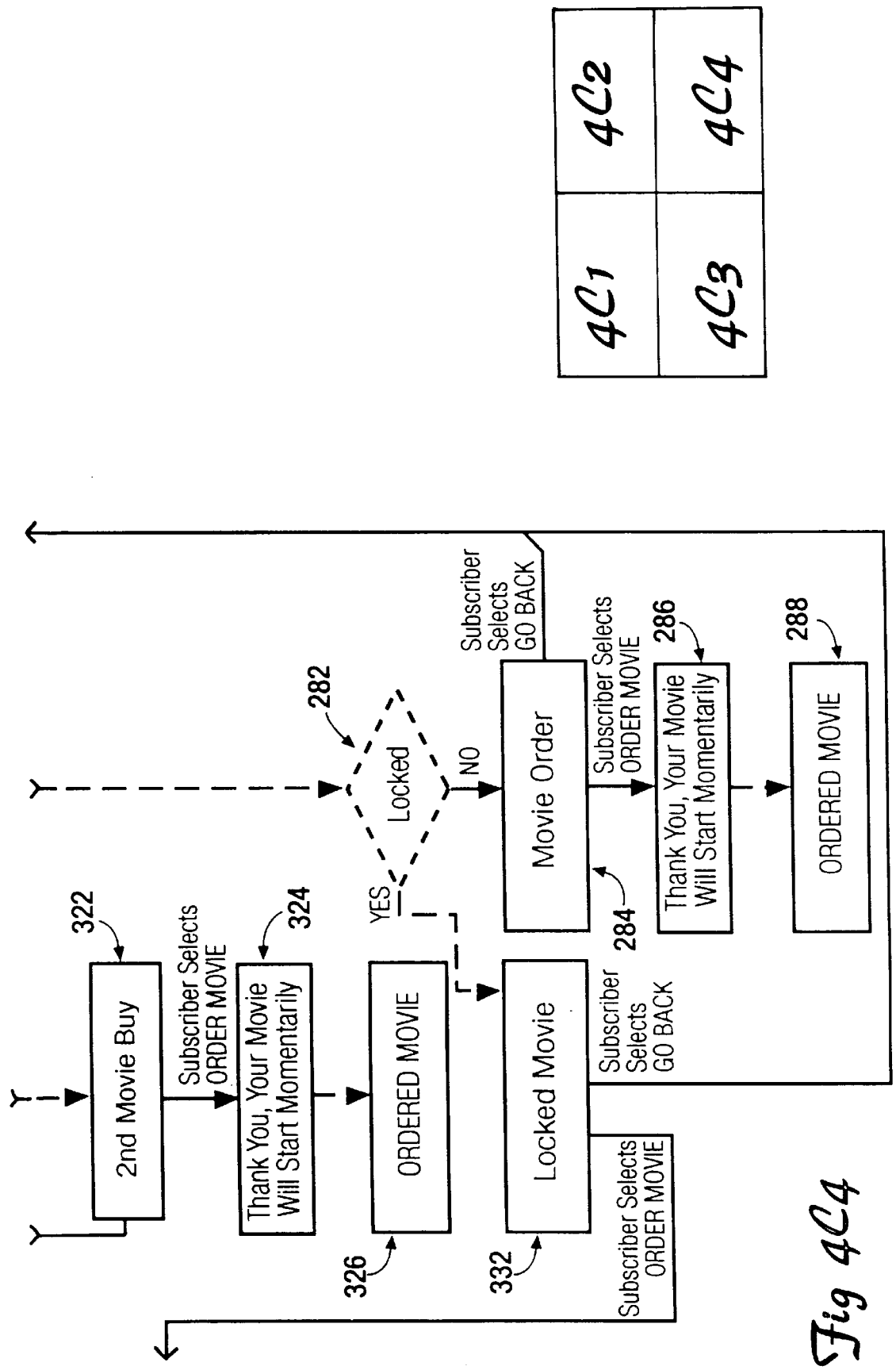
Fig 4C4

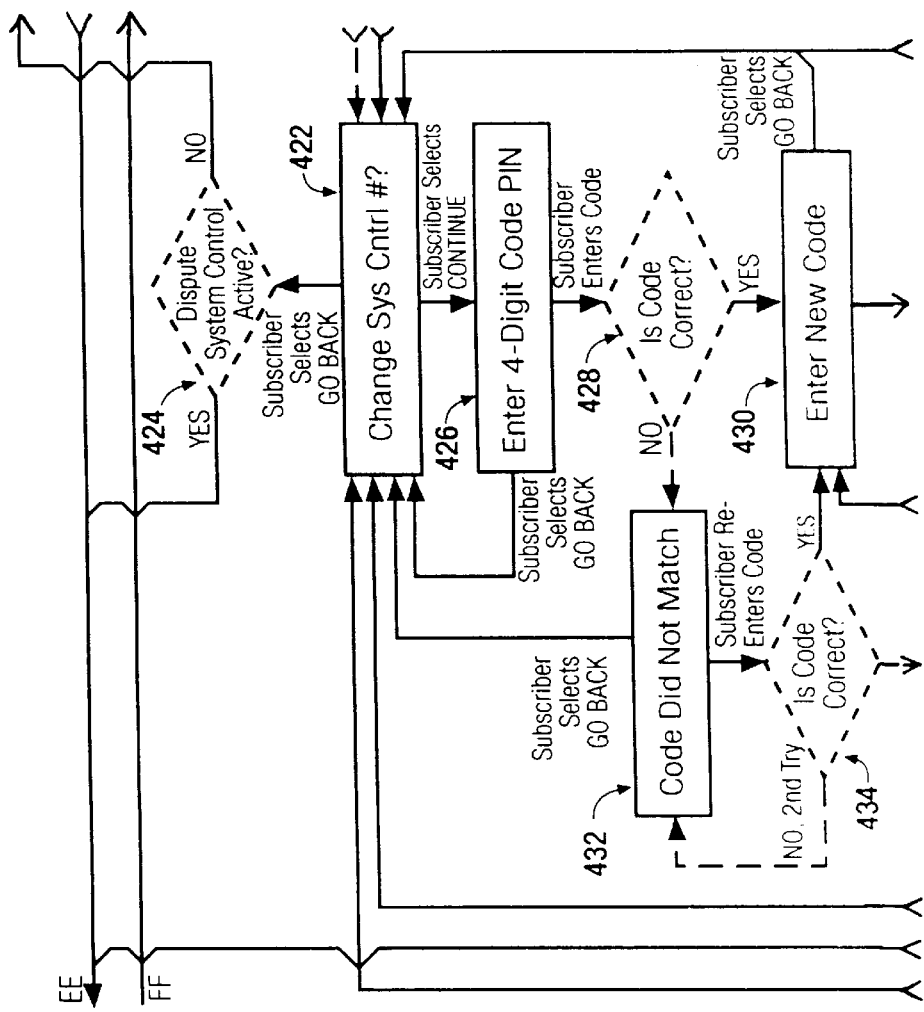
Fig. 4D1
| 4D1 | 4D2 |
|---|---|
| 4D3 | 4D4 |

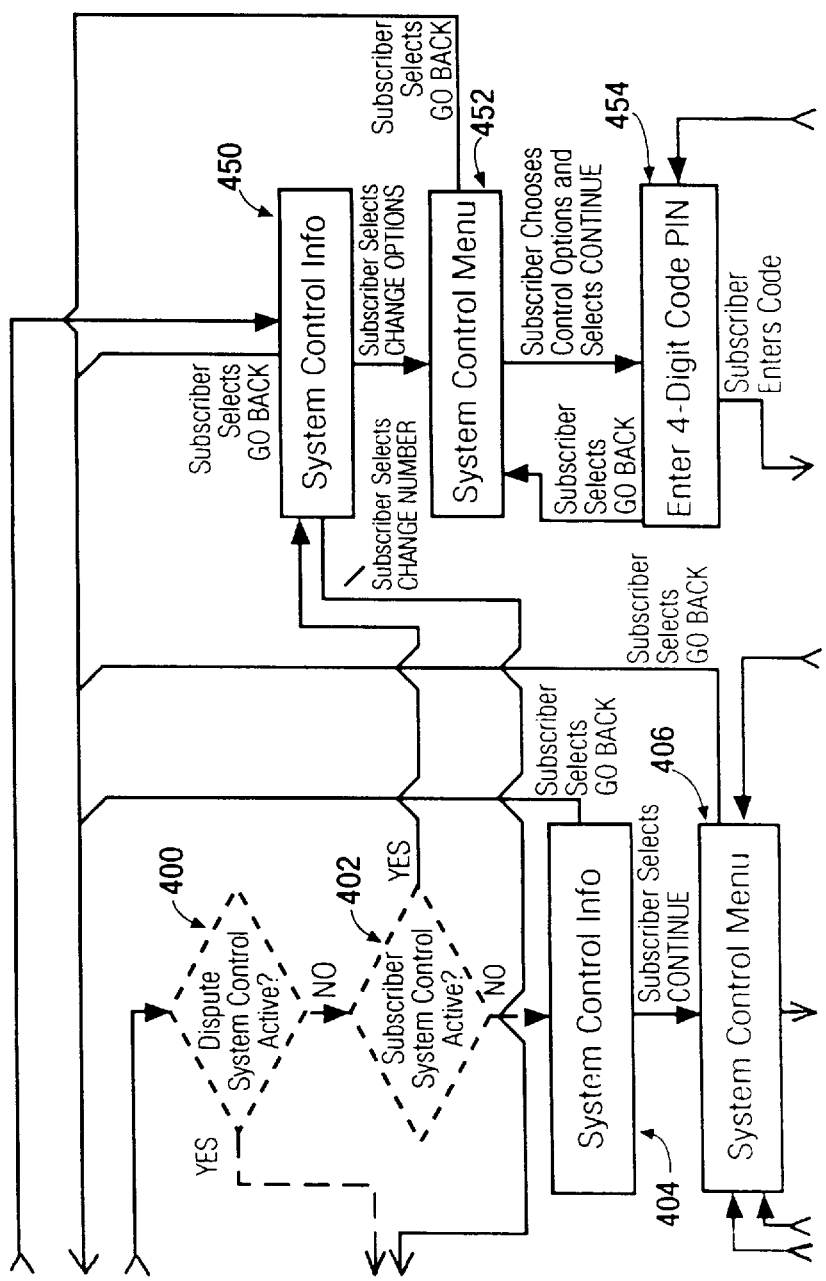
Fig. 4D2

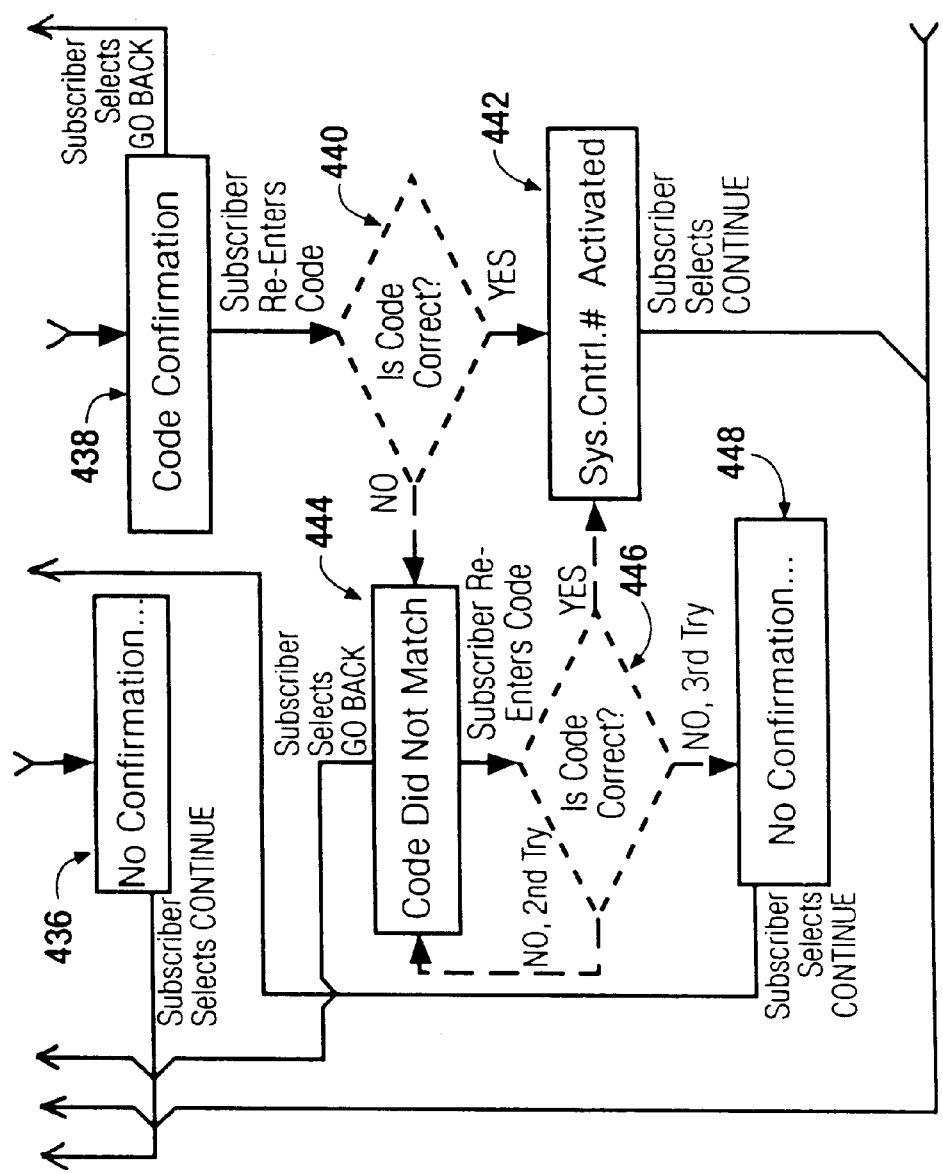
Fig. 4D3

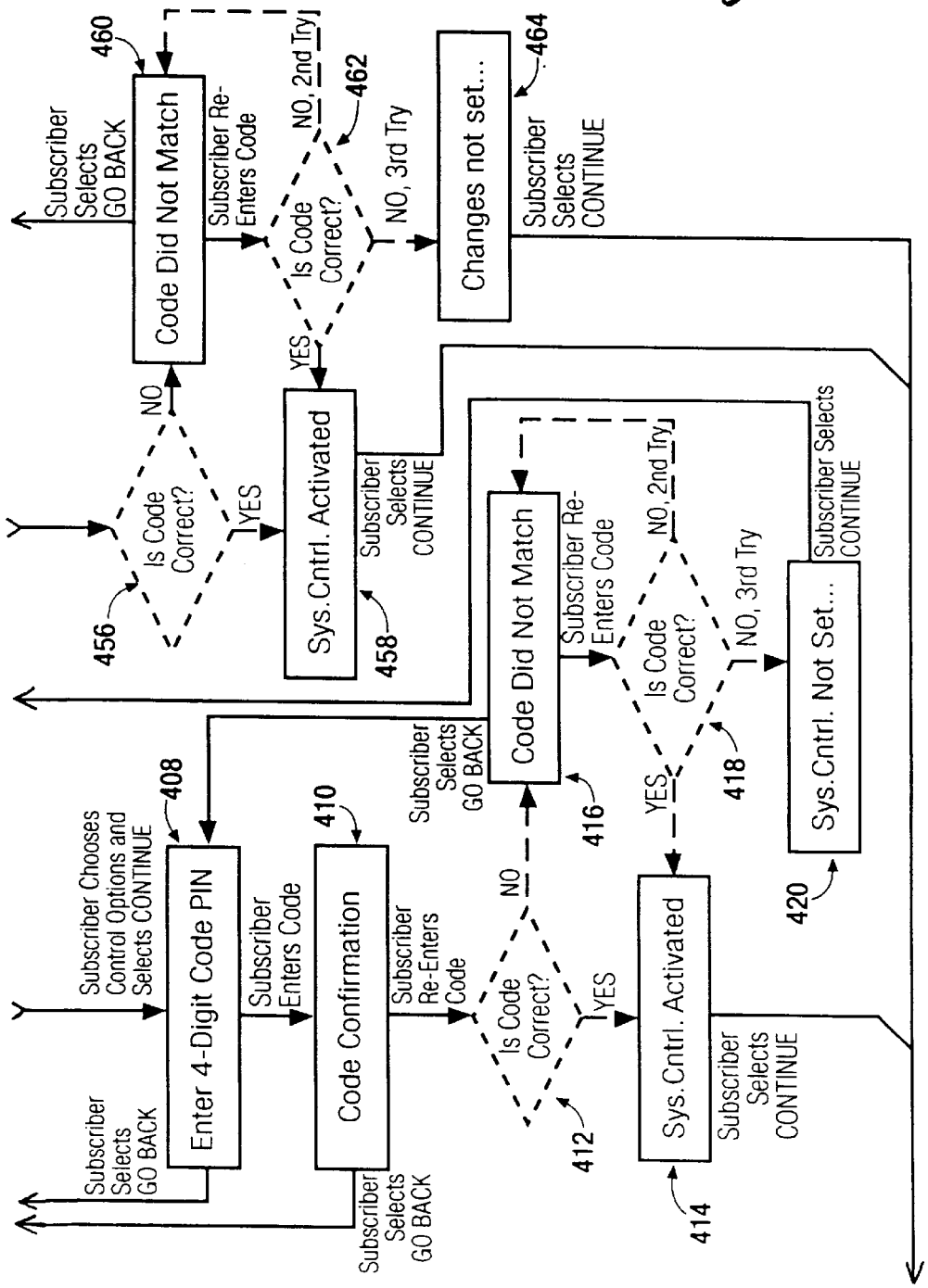
Fig. 4D4

MULTIPLE DWELLING UNIT INTERACTIVE AUDIO/VIDEO DISTRIBUTION SYSTEM

BACKGROUND OF THE INVENTION

The present invention relates to a cable television system for delivery of television programming, on demand movies, and interactive services, (such as Internet, e-mail, video shopping and video games) to a subscriber's residence.

Over the past decade, video on demand systems have found widespread use in the lodging industry to provide movies, interactive guest services, and (more recently) interactive video games to a hotel guest. These systems allow the hotel guest to view a movie, or play a video game, when the guest wants to, rather than at a regularly scheduled time.

Providing video on demand (VOD) services as part of a residential cable television system has been proposed for more than two decades. Beginning in the late 1970s, experimental cable television systems with VOD services have been operated in Japan, France, the United Kingdom, Canada, the Netherlands and the United States. VOD systems have been the subject of hundreds of technical articles, newspaper reports and patents. Despite this extensive activity, VOD technology has not, as yet, found significant commercial application outside the lodging industry.

SUMMARY OF THE INVENTION

The present invention is an audio/video distribution system in which video on demand programming and interactive services are normally jammed (or interdicted) by interdiction field units associated with the subscriber's residence (e.g. an apartment). Through an interactive session with on-screen menus, a subscriber selects a video on demand program (such as a movie, video game, interactive service or premium pay per view programming). The system headend allows access by the subscriber to interactive menus and to the program or service selected by instructing the interdiction field unit to unjam (or "deinterdict") the channel carrying the menus, programming and interactive services to the subscriber.

BRIEF DESCRIPTION OF THE DRAWINGS

FIG. 1 is a block diagram of the preferred embodiment of the cable television system of the present invention.

FIG. 2 illustrates a subscriber unit used in the system of FIG. 1.

FIG. 3 is a block diagram of the headend used in the system of FIG. 1.

FIGS. 4A–4D are a flowchart of the preferred movie purchase protocol used in the present invention.

DETAILED DESCRIPTION OF THE PREFERRED EMBODIMENTS

1. System Overview (FIG. 1)

FIG. 1 is a block diagram showing a system overview of cable television system 10 for delivery of television programming, video-on-demand (VOD) movies, interactive video games and other interactive video services to a subscriber's residence. Cable television system 10 includes three primary portions: headend 12, distribution system 14, and subscriber units 16.

In FIG. 1, system 10 is installed in a multiple dwelling unit such as an apartment complex, condominium complex or dormitory. Each subscriber unit 16 is located in a subscriber residence (such as apartments 18A–18D of FIG. 1).

Audio/video RF signals for all channels of the cable television system 10 are provided from headend 12. In addition, headend 12 provides interdiction control data, and transmits and receives system data via distribution system 14. The audio/video RF signals from headend 12 may include off-air local television channels, direct broadcast satellite programming, standard cable subscription programming, premium tier programming (such as HBO, Cinemax, etc.), event pay-per-view programming, interactive menus, video-on-demand programming, interactive video games and other interactive video or multimedia services (such as Internet, e-mail, and home shopping). Based upon system control data transmitted and received via distribution system 14 from subscriber units 16, headend 12 controls the operation of interactive menus, VOD movies, interactive games and other interactive services. Headend 12 controls which subscribers will have access to interactive menus, VOD movies, video games, interactive video services, and event pay-per-view programming by controlling the interdiction field units 28 with the interdiction control data.

Distribution system 14 includes cable 20, power supply 22, power inserter 24, two-way amplifiers 26, interdiction field units 28, and home-run distribution cables 30A–30D. Distribution system 14 is responsible for allowing all of the entertainment programming, communications information, keystrokes, and power for system interdiction to reach the necessary devices and subscribers.

Power supply 22 and power inserter 24 supply line power which is carried on cable 20 to amplifiers 26 and interdiction field units 28. The power supplied over cable 20 is consumed by interdiction field units 28, and is not passed through interdiction field units 28 to the individual subscribers. Although a single power supply 22 and power inserter 24 are shown in FIG. 1, in some situations multiple power supplies and power inserters may be required in order to power all of the interdiction field units within cable television system 10.

The audio/video RF signals are provided from headend 12 over cable 20 in an unjammed form. Each interdiction field unit 28 is connected through home-run distribution cables 30A–30D to the residences of a number of different subscribers. In FIG. 1, four individual subscribers residences (apartments 18A–18D) are shown connected to a single interdiction field unit 28 by cables 30A–30D, respectively. The other interdiction field units illustrated in FIG. 1 are similarly connected to other subscriber residences. In a preferred embodiment, interdiction field units 28 are Video-Mask 4-port addressable interdiction units from Blonder Tongue Laboratories.

All of the RF channels supplied to interdiction field unit 28 from headend 12 are delivered from the interdiction field unit 28 over home-run cables 30A–30D to individual subscriber unit 16. Based upon interdiction control data received over cable 20 from headend 12, interdiction field unit 28 selectively interdicts or jams certain of the channels being delivered to subscriber units 16. The interdiction control data defines, for each subscriber unit 16, which channels will be jammed and which will not be jammed. In addition, the interdiction control data includes a command to interdiction field unit 28 to turn off all channels to a particular subscriber unit. This occurs when the tenant at a particular apartment has chosen not to be a subscriber. Although home-run cables 30A–30D are prewired to each apartment 18A–18D, interdiction field unit 28 blocks all RF channels from reaching any apartment where the cable television service has not been ordered.

System data from headend 12 is transmitted over cable 20, through interdiction field unit 28 and over home-run cables 30A–30D to subscriber units 16. In addition, system data from subscriber unit 16 is transmitted back over home-run cables 30A–30D through interdiction field unit 28, and back to headend 12 over cable 20. Thus, system 10 features two-way transmission of system data.

As shown in FIG. 2, subscriber unit 16 includes cable tap 40, subscriber terminal 42, television 44, subscriber remote control 46, television remote control 48, video game controller 50, optional keyboard 52, and cables 53, 54, 55 and 56.

Subscriber terminal 42 is a cable device that passes inputs such as keystrokes and status information from subscriber units 16 to headend 12 and receives communications signals back from headend 12. The inputs, status information and communications signals form a part of the system data. The RF signals in the form of television channels are also passed through subscriber terminal 42 to television 44.

As shown in FIG. 1, home-run cables 30A–30D carry RF channels and system data between interdiction field unit 28 and cable tap 40 at subscriber unit 16. Cable 53 connects cable tap 40 to subscriber terminal 42. The RF television channels pass through subscriber terminal 42 to television 44 via cable 54.

Subscriber terminal 42 is powered by AC power supplied through power cord 58 from wall outlet 60. Similarly, television 44 receives its electrical power through power cord 62 from wall outlet 60.

Subscriber terminal 42 includes a small numerical display 64. In a preferred embodiment, display 64 is capable of showing two and one-half characters that are approximately 0.4 inches in height. Display 64 is used for showing a subscriber what channel has been allocated to the subscriber for an interactive session in which video on demand movies, interactive games, interactive services, or pay-per-view programming may be ordered and received. Display 64 can change more than once during an interactive session to establish a new channel number to which the subscriber must tune. Display 64 may also be used to indicate the channels on which certain pay-per-view movies, games or events are currently running in the subscriber's apartment.

Keystrokes from subscriber remote control 46 are transmitted from an infrared transmitter within remote control 46 to an infrared receiver within subscriber terminal 42. The keystrokes are passed to headend 12 through a path which includes cable 53, home-run cable 30A–30D, interdiction field unit 28, and distribution cable 20. The subscriber selects options by viewing interactive menus on the screen of television 44 and pressing keys of subscriber remote control 46 accordingly. Those key presses are received by subscriber terminal 42. In response to polling signals from headend 12, subscriber terminal 42 provides system data to headend 12 which indicates which keys have been pressed.

In the embodiment shown in FIG. 2, subscriber remote control 46 only provides control signals to subscriber terminal 42. It does not control the subscriber's television 44 or other video equipment such as a VCR. Instead, the control of television 44 is provided through television remote control 48. Alternatively, the functions of subscriber remote control 46 and television remote control 48 can be combined in a single multi-function remote control.

The keys on subscriber remote control 46 are used to initiate and navigate an interactive session only. All sound and channel tuning functions, and on/off control of television 44 are accomplished by the television remote control 48 and not by subscriber remote control 46. This simplifies and reduces the cost of subscriber remote 46 and subscriber terminal 42.

Subscriber terminal 42 understands a predefined infrared (IR) code consistent with most commercially available multi-brand remote controls. If television remote control 48 is capable of learning IR codes from other remote controls, the subscriber can "teach" TV remote control 48 the codes of subscriber remote control 46 and then use a single device (TV remote control 48) to control both television 44, subscriber terminal 42, and any other equipment such as a related VCR.

Video game controller 50 is connected to subscriber terminal 42 through cable 55. Alternatively, video game controller 50 can be connected via an IR link. Keystrokes from game controller 50 are supplied to subscriber terminal 42, and are supplied as part of system data in response to polling of the various subscriber units 16 by headend 12. In some embodiments, video game controller 50 includes keys which duplicate keys on subscriber remote control 46 so that video game controller 50 can be used to initiate interactive sessions and order programs without the need to use subscriber remote control 46.

Keyboard 52 is connected to subscriber terminal 42 through cable 56. Alternatively, keyboard 52 can be connected via an IR link. Keystrokes from keyboard 52 are supplied from subscriber terminal 42 to headend 12 in response to polling. Keyboard 52 is useful for interactive services such as Internet, e-mail and computer games. Keyboard 52 can, in some cases, be used to initiate interactive sessions and order programs rather than using subscriber remote control 46.

2. General System Operation

When a new subscriber wishes to receive service, the subscriber will contact the cable television system operator to obtain subscriber terminal 42, subscriber remote control 46, game controller 50, keyboard 52 and the associated cables 53–56. As a part of signing on with the cable system operator, the subscriber will provide billing information including name, address, and telephone number. That subscriber information is stored in a subscriber database.

Subscriber terminal 42 has a non-volatile stored address which is associated with the subscriber in the subscriber database. The address of the subscriber terminal 42 is transferred by the cable television system operator to headend 12, where it is associated with the particular interdiction field unit 28 which serves the apartment of that subscriber. Headend 12 instructs interdiction field unit 28 to turn on communications and deinterdict the appropriate channel (s) over the home run cable 30A–30D to the subscriber's apartment, and enables two-way system data communication with that address.

The subscriber follows installation instructions which are provided with terminal 42 to provide the connections shown in FIG. 2. Once the installation is complete, subscriber terminal 42 will begin responding to its address when it is polled by headend 12.

When the subscriber pushes the appropriate button (e.g., a "MENU" button) on subscriber remote control 46, the keystroke is detected by subscriber terminal 42, and the keystroke is sent back to headend 12 in response to the next polling. The pressing of the MENU button requests that an interactive port be assigned by headend 12 to subscriber unit 16. Headend 12 sets up a new interactive session and connects an interactive port to an available RF channel. Headend 12 provides system data through distribution system 14 to subscriber terminal 42 which instructs subscriber terminal 42 to display the channel number of the selected channel on display 64.

In addition to preparing an interactive port and causing the selected channel to be displayed on display 64 of subscriber terminal 42, headend 12 also must de-interdict (unjam) the selected channel for only the requesting subscriber. The channel is de-interdicted by sending interdiction control data to the proper interdiction field unit 28 for the requesting subscriber. The interdiction control data typically includes an address of the proper interdiction field unit 28, an address of the port of that interdiction field unit 28 which corresponds to the requesting subscriber, and a command identifying the particular channel to be de-interdicted.

After the channel number is displayed on display 64, the subscriber must tune television 44 using the manufacturer's remote control 48 to the channel shown on display 64 in order to see and use interactive menus. Once television 44 is tuned to the correct channel, the subscriber can use subscriber remote control 46 to navigate through the interactive menus. A subscriber can choose from movies, video games, interactive services, or pay-per-view (PPV) events that are menued.

The present invention includes two forms of System Control, each of which may require the subscriber to enter a four digit code or personal identification number (PIN) to continue. One form of this System Control is Dispute System Control. Dispute System Control is instituted by the cable television system operator in order to insure that no programming purchase can be made from a particular subscriber's apartment without entry of the PIN. Dispute System Control may be instituted for a particular subscriber in the event of disputed prior charges appearing on the subscriber's monthly bill, for example. When active, Dispute System Control requires entry of a PIN prior to viewing the Main Menu.

The second form is Subscriber System Control, instituted by the subscriber, and allows the subscriber to require the entry of a PIN before permitting access to certain categories of movies, events, or other available system programming. This Subscriber System Control includes the option of requiring a PIN based on the rating of the movie, such as PG-13 or R. This allows a parent to control the categories and individual movies (based on ratings) available to children in the apartment.

Following selection of a movie, game, interactive service or PPV event for purchase, the subscriber may be required to enter a personal identification number (PIN) number to confirm the purchase. If the PIN matches a subscriber initiated and stored PIN for that residence (which is stored at headend 12), the selected movie, game, or PPV event is approved for purchase. The timing of entering the PIN is configurable, and can occur at other times in the interactive session, such as prior to entering the main menu.

After confirmation of the PIN is completed, headend 12 creates a billing record for the purchase. Once a day, the billing records from headend 12 are retrieved by a main system computer operated by the cable system operator, and purchases are added to the proper subscriber's cable bill for that month.

If the movie ordered by the subscriber is not already playing, headend 12 plays the movie on the channel which has already been assigned to that subscriber during that interactive session. Similarly, if a video game is selected, the video game will be available on the same channel that was previously used for the interactive menu.

There are other purchase scenarios which require a subscriber to tune to a second channel after making a purchase. For example, purchase of a PPV event requires the subscriber to tune to a common channel on which all viewers of that PPV event are tuned. Upon confirmation of the purchase of the PPV event, headend 12 provides a new instruction to subscriber terminal 42 to display the channel on display 64 to which the subscriber must tune with the TV manufacturer's remote 48. Headend 12 also provides the necessary interdiction control data to interdiction field unit 28 to de-interdict, for that particular subscriber, the PPV event channel.

Another situation where a subscriber must tune to a second channel occurs when a subscriber chooses to join a VOD movie which has already been started by another subscriber. In this join-in-progress scenario, the subscriber is informed through the interactive menu that the movie is already in progress. Upon purchasing the movie in progress, the subscriber is instructed to tune to a second channel which is displayed on display 64. That displayed channel corresponds to the channel on which the VOD movie is already playing. Headend 12 provides the interdiction control data to interdiction field unit 28 to de-interdict the VOD movie channel in progress for the specific subscriber's apartment.

Upon a subscriber tuning to a second channel, such as in the case of a purchase of a PPV event or a VOD movie already in progress, headend 12 ends the interactive session and provides interdiction control data to cause the first channel on which interactive menus were displayed to again be interdicted to that subscriber.

When the purchased movie, video game, interactive service or PPV event is finished, headend 12 provides interdiction control data to the interdiction field unit 28 to interdict the channel that was being used by the addressed subscriber. That prevents the subscriber from obtaining programming other than what has been ordered, and also frees up the channel for use by other subscribers.

3. Headend 12 (FIG. 3)

A preferred embodiment of headend 12 is shown in FIG. 3. Headend 12 includes UNIX host computer 70 (UHC), RF modem 72, interdiction controller 74, game platform 76, multimedia platform 78, on-demand movie system 80, video switch 82, a bank of selectable modulators 84, satellite dish 86, receivers 88, a bank of preassigned modulators 90, off-air antenna 92, off-air processors 94, combiner 96, diplexer 98, and telecom modems 100 and 102.

UNIX host computer (UHC) 70 is, in a preferred embodiment, a Pentium computer which runs UNIX operating code together with software for coordinating the operations of the components of headend 12 shown in FIG. 3. UHC 70 houses several different computer cards and components. In the embodiment shown in FIG. 3, UHC 70 includes a synchronous data link control card (SDLC), an intelligent communications processor card (ICP), a multiport serial card, an Ethernet card, and a number of video port cards. In addition, UHC 70 also houses a floppy disk drive, a tape backup drive, and a hard disk drive.

UHC 70 manages the operation of several other devices of headend 12, together with communication tasks. The devices controlled or communicated with by UHC 70 include RF modem 72, interdiction controller 74, game platform 76, multimedia platform 78, and video switch 82.

UHC 70 is also in charge of polling all of the subscriber terminals 42 (shown in FIG. 2) for keystroke activity. The polling function is performed by the ICP via RF modem 72. The results of the polling are received back over cable 20 and are routed through diplexer 98 back to RF modem 72, and then to UHC 70.

External communication between headend 12 and the main facility of the cable operator is performed through telecommunications modem 100 (or other wide area networking systems). The external communication includes, for example, a transfer to UHC 70 of subscriber information from a subscriber database maintained by the cable operator. Information regarding subscriber purchases is periodically downloaded from UHC 70 through modem 100 to the cable operator's main facility.

UHC 70 is connected to the other components of headend 12 through a variety of different lines using different signal formats and protocols. The SDLC card is connected to RF modem 72 through high speed serial line 110. Similarly, the ICP card of UHC 70 is connected to RF modem 72 through high speed serial line 112.

The serial card of UHC 70 communicates with other components of headend 12 through RS 232 serial lines 114, 116, 118, 120, and 122. Line 114 is connected between the serial card and RF modem 72. Line 116 connects the serial card with interdiction controller 74. Line 118 is connected between the serial card and modem 100. Line 120 is connected between the serial card and video switch 82. Line 122 connects the serial card with multimedia platform 78.

The Ethernet card of UHC 70 is connected to multimedia platform 78 through Ethernet cable 124.

All but one of the video ports of UHC 70 are connected to inputs of video switch 82 as shown in FIG. 3. A separate line 126A–126D for carrying baseband audio and video connects the output of each video port to an input of video switch 82.

One video port of UHC 70 is used as the system "Busy/Barker." It is connected to one of the preassigned modulators 90 (e.g. the modulator for channel 23). The Busy/Barker video port provides over channel 23 an information slide show describing interactive services when interactive channels are available for use and provides a "System Busy" message when all interactive channels are in use. Alternatively, the "Busy/Barker" function can be provided by a CD-ROM which shows video clips or highlights on channel 23 and provides the "System Busy" message when all interactive channels are in use.

RF modem 72 is a dual port modem where the output port of modem 72 is connected to line 128 and the return or input port is connected to line 130. RF modem 72 also communicates over array control line 132 with game platform 76.

RF modem 72 converts RS232 serial communications (received over line 112 from the ICP within UHC 70) to RF serial communications that subscriber terminal 42 understands. Those RF serial communications are system data provided over output line 128 to combiner 96.

Keystrokes produced by remote control 46 or game controller 50 (shown in FIG. 1) are received at subscriber terminal 42. Upon being polled by UHC 70 through RF modem 72, subscriber terminal 42 replies with keystroke data. That keystroke data is derived from cable 20 by diplexer 98 and supplied over line 130 back to RF modem 72. The keystroke communications from subscriber terminal 42 are converted by RF modem 72 to data that UHC 70 can understand, and that data is provided back to the ICP card over high speed serial line 112.

RF modem 72 also performs functions related to the operation of game platform 76. RF modem 72 passes high speed serial communications received over line 110 from the SDLC card, as well as baseband serial communication in the RS 232 format from the serial card, to game platform 76. The communications from UHC 70 to game platform 76 through modem 72 are provided in two ways. First, high speed information from the SDLC is provided by RF modem 72 over output line 128. Rather than addressing the information to one of the subscriber terminals 42, the information is addressed to game platform 76. Second, array control information, which selects the particular game port of game platform 76 which will be operating for a particular subscriber, is provided over array control line 132. That information is based upon the serial information from the serial card of UHC 70.

Interdiction controller 74 receives inputs from the serial card of UHC 70 over line 116 and from the cable operator through telecom modem 102 and line 134. In a preferred embodiment, interdiction controller 74 is a VideoMask Interdiction intelligent transmitter (FIX), from Blonder Tongue Laboratories. The ITX is a X86 single board computer attached to an FSK card that communicates with interdiction field units 28 (shown in FIG. 1). Signals are sent from interdiction controller 74 over interdiction control line 136 to combiner 96. The interdiction control data transmitted by the interdiction controller 74 is combined by combiner 96 with the system data signals from RF modem 72, with the audio/video RF signals from modulators 84 and 90 and with audio/visual RF signals from off-air processors 94.

Interdiction controller 74 is responsible for giving control, reset, and calibration commands to interdiction field units 28. Interdiction controller 74 is capable of addressing interdiction field units 28 individually, and can address the individual output ports of the interdiction field units 28 so as to individually control the interdiction of channels to each individual subscriber.

The control signals from the cable operator through telecom modem 102 and control line 134 will cause interdiction controller 74 to define the interdiction of channels to individual subscribers based upon the basic services ordered by the subscriber. This may include a basic cable package with or without premium programming channels such as HBO, Cinemax, and the like.

The control signals from UHC 70 to interdiction controller 74, on the other hand, control interdiction of the interactive channels which are provided to the subscriber from headend 12. These include video on demand movie services, interactive games, and multimedia services such as video shopping or the Internet. The selection of those services are achieved by interaction between the subscriber and headend 12 through interactive menus displayed on the subscriber's television 44, and keystrokes which are entered through the subscriber remote control 46, or game controller 50 or keyboard 52.

Game platform 76 is a device that allows a subscriber to purchase an interactive video game and to view that game on television 44. Game platform 76 sends the game audio and video and game data through video switch 82, one of the modulators 84, combiner 96 and diplexer 98, onto cable 20 to subscriber terminal 42.

Game platform 76 receives information from UHC 70 through RF modem 72 on line 128, and also receives array control information which selects the particular game port over line 132 from modem 72. Keystrokes which are received back from the game controller 50 through subscriber terminal 42, homerun cable 30A–30D, interdiction field unit 28, and cable 20 are directed back by diplexer 98 over line 130 to RF modem 72 and to game platform 76. The individual keystrokes are sorted so that they are routed to the proper game engine corresponding to the subscriber who has sent the keystrokes.

In a preferred embodiment of the present invention, UHC 70 polls those subscriber terminals 42 involved in interactive game play at a higher rate than the other subscriber terminals. This is needed in order to provide keystroke data at a sufficiently high rate (typically at least sixty keystroke interrogations per second) to provide adequately responsive video game play.

Game platform 76 may contain all game control data itself, or game data may be stored in UHC 70. In the latter case, when the subscriber has ordered a game, UHC 70 downloads the necessary game control data through SDLC and line 110 to RF modem 72, which provides that downloaded data over line 128 to game platform 76 where it is stored for use by the particular game port that is in play.

An example of one form in which game platform 76 may be implemented, is described in a copending patent application Ser. No. 08/288,626 filed Aug. 10, 1994, which is assigned to the same assignee as the present application. That application is hereby incorporated by reference.

Game platform 76 provides an output from each of its game ports. Output lines 138A–138C connect the output of each game port to an input of video switch 82. The signals from game ports of game platform 76 are transmitted over lines 138A–138C in the form of baseband audio and video signals.

Multimedia platform 78 is a multimedia computer capable of providing a wide variety of different audio and visual programs to a subscriber. Examples of programming produced by multimedia platform 78 include interactive home shopping, video directories, advertising and other information services, and surveys and opinion polls, and connection to the Internet and e-mail.

Multimedia platform 78 receives data and control signals from UHC 70 over serial line 122 and Ethernet bus 124. The output of multimedia platform 78 is one or more baseband audio/video outputs. In the block diagram shown in FIG. 3, the audio/visual output of multimedia platform 78 is shown as a single output line 140 connected to an input of video switch 82, but the number of output lines will vary depending upon the number of outputs of multimedia platform 78.

On-demand movie system 80 includes an array of video sources, each capable of providing baseband audio/video signals. In the particular embodiment shown in FIG. 3, on-demand movie system 80 includes an array of video cassette players (VCPs) 142A–142D. In this embodiment, each VCP 142A–142D is an off-the-shelf video cassette player that is dedicated to playing one movie title. A video cassette is pre-loaded into each VCP 142A–142D. The number of VCPs and movie titles depends upon the number of subscribers at a given property, and typically will be more than the four VCPs shown by way of example in FIG. 3.

In the embodiment shown in FIG. 3, control of VCPs 142A–142D is provided by UHC 70 through video switch 82. UHC 70 selects the particular VCP to be played, based upon keystrokes received from the subscriber during an interactive menu session. Signals provided from the serial card over line 120 to video switch 82 in turn cause control signals to be provided over line 146 to the individual VCPs 142A–142D. The signals from video switch 82 on line 146 are in the S-Control protocol.

The outputs of VCPs 142A–142D are baseband audio/video signals. In FIG. 3, each VCP 142A–142D supplies its baseband audio/video output over an individual line 148A–148D, respectively, to an input of video switch 82.

In other embodiments, on-demand movie system 80 uses other forms of video sources. For example, video disk players may be used instead of, or in addition to video cassette players 142A–142D. Alternatively, one or more digital video servers may act as the video sources of on-demand movie system 80. In each of these embodiments, on-demand movie system 80 provides a number of individual audio/video baseband outputs to individual inputs of video switch 82.

Video switch 82 is a device that receives baseband audio and video signals at its input ports, and routes those signals to output ports which are connected through individual lines 150 to the inputs of individual modulators 84. Video switch 82 is capable of connecting any one of the baseband audio/video signals received at its inputs to any one or more of the bank of modulators 84.

In one preferred embodiment, video switch 82 has 36 input ports and 12 output ports. If additional outputs are needed, a second, similar video switch can be connected in parallel, so that it receives all of the same inputs, but has a second set of outputs connected to a second set of modulators. Similarly, one or more additional video switches can be used to provide additional inputs, if necessary.

Video switch 82 is operated through a serial connection to UHC 70 over line 120. UHC 70 controls video switch 82 by telling it which input port to connect to which output port. Each of the output ports of video switch 82 is connected to an individual modulator 84 which corresponds to an RF channel which is normally interdicted.

The S-Control signals provided from video switch 82 to on-demand movie system 80 are generated within video switch 82 based upon serial signals received from UHC 70. S-Control is the communication code that tells a VCP 142A–142D what to do when it receives a certain signal. Messages that can be relayed from UHC 70 through video switch 82 to the VCPs 142A–142D include Stop, Play, Rewind, Fast Forward, Turn On, Turn Off, Eject and Auto Tracking.

Modulators 84 convert baseband video and audio signals received at their inputs to RF and deliver the signals to combiner 96. Each modulator is set to modulate on a specific frequency or RF channel. The outputs of modulators 84 are connected by lines 152 to inputs of combiner 96.

As shown in FIG. 3, headend 12 also includes cable and off-air programming which is received through satellite dish 86 and off-air antenna 92, respectively. The signals from satellite dish 86 are provided over lines 154 to a bank of receivers 88. The output of the receivers 88 are baseband audio/video signals which are supplied over lines 156 to the inputs of modulators 90. Each modulator 90 is tuned to a different channel. The outputs of modulators 90 are RF signals which are supplied over lines 158 to inputs of combiner 96.

The signals received by satellite dish 86 can include both standard cable satellite programming, as well as event pay-per-view programming. With the system 10 of the present invention, event pay-per-view programs can also be selected through interactive menus generated by UHC 70, rather than requiring a subscriber to make a telephone call in order to order the pay-per-view programming. This simplifies the procedure, increases ease with which an impulse purchase of a pay-per-view program will be made, and generally encourages an increase in the number of purchases of event pay-per-view programming. In other embodiments, UHC 70 can selectively control operation of receivers 88 so as to control the availability of satellite programming over cable 20.

Antenna 92 receives off-air programming and supplies to off-air processors 94 the RF signals it received over line 160. Off-air processors 94 condition the RF signals from antenna 92 and supply them to combiner 96 over line 162. Since the signals from antenna 92 are already on preassigned assigned RF channels, no additional modulator is required between the output of off-air processors 94 and the inputs of combiner 96.

4. Interactive Menu Movie Purchase Protocol (FIGS. 4A–4D

FIGS. 4A–4D are a diagram illustrating the movie purchase protocol in the cable entertainment system 10 of the present invention. In the diagram shown in FIGS. 4A–4D, those boxes and lines which are solid lines denote decisions or selections made by a subscriber. Those which appear in dashed lines represent a decision or selection which is made by UHC 70. Lines connecting portions of FIGS. 4A–4D are designated by letters "AA" through "MM".

In this example, only a movie purchase protocol is shown. In order to provide interactive video games through game platform 76, multimedia interactive services through multimedia platform 78, internet access, e-mail, and event pay-per-view programming, a Main Menu will list each of those services as a menu choice. For sake of clarity, the flow diagram in FIGS. 4A–4D has been simplified to cover only movie purchases, with the understanding that similar steps would be performed in the event that a game, interactive multimedia programming, or event pay-per-view programming services were to be purchased.

Initially, the subscriber surfs through the channel line up of non-interdicted channels. This is represented by screen 200. In the course of the channel surfing, the subscriber surfs to a channel (e.g. channel 23) on which the information slide show normally appears. Channel 23 is one of the regular non-interdicted channels.

When the subscriber reaches Channel 23, the information which is provided will depend upon the status of the system, as illustrated by the System Busy decision box 202. If all interactive channels are in use, UHC 70 causes a "System Is Busy" screen 204 to be displayed on the television 44. As the subscriber continues to surf the basic cable channels, the subscriber returns to the normal Channel Line Up shown by screen 200.

If an interactive channel is available for use by the subscriber, then an Information Slide Show, illustrated by screen 206, appears on Channel 23. The subscriber can watch the Information Slide Show to obtain information about interactive services that are available for selection, and then can continue to surf the basic cable channels as illustrated by screen 200.

When the subscriber presses the MENU button on subscriber remote control 46, UHC 70 first determines whether the system is busy, as shown in decision box 208. If the system is busy, UHC 70 signals terminal 42 to cause display 64 of terminal 42 to display "23", as shown in oval 210. When the subscriber then tunes to channel 23, "System Is Busy" screen 204 appears. The subscriber then returns to the basic cable channel line up (screen 200).

If the system is not busy when the subscriber presses MENU, terminal 42 receives from UHC 70 the number of an available interactive channel. That interactive channel number is displayed on 64, as shown in oval 212. The subscriber then tunes to the displayed channel using TV remote control 48, and Welcome screen 214 appears on television 44. The subscriber is instructed on the Welcome screen to press "SELECT" to continue.

At that point, UHC 70 determines whether Dispute System Control is active, as shown in decision box 216. If Dispute System Control is active and this is the first interactive session conducted by the subscriber, System Control Notice screen 218 is displayed on television 44. If the subscriber selects EXIT at that point, EXIT screen 219 is displayed. The subscriber then can leave the interactive session by simply surfing the cable channel line up as illustrated by screen 200. The subscriber can also return to System Control Notice screen 218 by selecting GO BACK on subscriber remote 46.

In response to the System Control Notice screen 218, the subscriber selects CONTINUE in order to proceed with the system control initial procedure. Screen 220, which is then displayed on television 44, instructs the subscriber to enter a four-digit code personal identification number (PIN).

When the subscriber has entered the PIN, Code Confirmation screen 222 is then displayed on television 44. In response to Code Confirmation screen 222, the subscriber reenters the PIN.

During this process, when either screen 220 or screen 222 is being displayed, the subscriber can return to System Control Notice screen 218 by selecting GO BACK on subscriber remote control 46.

When the subscriber reenters the four-digit PIN in response to Code Confirmation screen 222, UHC 70 checks the reentered code against the previously entered PIN. This decision is indicated at decision block 224.

If the subscriber correctly reentered the PIN, System Control Activated screen 226 is displayed. The subscriber can then continue with the ordering process by selecting CONTINUE on subscriber remote control 46. This leads over line AA to FIG. 4B.

If the reentered code does not match the four-digit code PIN, Code Did Not Match screen 228 is displayed on television 44. At that point, the subscriber can select GO BACK, which returns to System Control Notice screen 218. Alternatively, the subscriber may reenter the code, and UHC 70 again compares the reentered code to the previously entered PIN, as shown in decision block 230. If the code is correct on the second try, System Control Activated screen 226 is displayed. If the code is not correct on the second try, Code Did Not Match screen 228 is again displayed.

The subscriber is given up to three attempts to reenter the code. If, on the third try, the subscriber has again failed to reenter the code which matches the PIN, No Confirmation screen 232 is displayed. The subscriber then has only one choice, to select CONTINUE and return to System Control Notice screen 218.

The remaining screen shown on FIG. 4A is Exit/Go Back screen 234. This screen is reached when a subscriber exits MAIN MENU screen 236 shown in FIG. 4B. The exit leads to a path over line DD to screen 234. The subscriber can exit the interactive channel by surfing in Channel Line Up 200, or can go back to the MAIN MENU screen 236 over line CC by selecting GO BACK on subscriber remote control 46.

If Dispute System Control is not active, the subscriber is taken directly from Decision Box 216 to MAIN MENU 236 via line BB.

As shown in FIG. 4A, three lines AA, BB, and CC lead to MAIN MENU screen 236 on FIG. 4B. MAIN MENU screen 236 provides a menu of interactive services which are available for selection by the subscriber. In this particular example, the protocol for movie ordering is illustrated in FIGS. 4B and 4C. "MOVIES" is one of the menu items available for selection on MAIN MENU screen 236.

When the subscriber selects MOVIES, UHC 70 first determines whether the subscriber has exceeded a specified dollar credit limit. As shown by decision block 238, if the dollar credit limit has been exceeded, Limit Exceeded screen 240 is displayed. Screen 240 provides instructions to the subscriber to call a toll free number to make credit/payment arrangements. The subscriber can then return to MAIN MENU screen 236 by selecting GO BACK on subscriber remote control 46.

If the credit limit has not been exceeded, UHC 70 determines whether one or two movies are already running at the subscribers residence, as shown by decision block 242. If there are no movies running, Movie Categories screen 244 is displayed.

If a movie is already running in the subscriber's residence, UHC 70 proceeds to decision block 246, which is a determination of whether there is only one movie running, or two movies running.

If only one movie is running, screen 248 is displayed. The subscriber is informed that there is already a purchased movie, and that the subscriber may either return to the already purchased movie at a listed TV channel, or may purchase a new movie.

As shown in FIG. 4B, there are three possible courses of action leading from screen 248. If the subscriber selects CONTINUE, this indicates an intention to purchase new movies. Movie Categories screen 244 is then displayed.

If the subscriber decides to return to the already ordered movie, this is accomplished by tuning television 44 to the channel which is listed on screen 248. The subscriber then receives the ordered movie, as illustrated by screen 250.

The third option in proceeding from screen 248 is to select GO BACK with subscriber remote control 46. This causes MAIN MENU screen 236 to be displayed once again.

If UHC 70 determines that there are two movies running at the subscriber's residence, screen 252 is displayed. Screen 252 informs the subscriber that the maximum number of pay-per-view events (which is two) have already been ordered. Screen 252 indicates the numbers of the two channels representing the two ordered movies.

If the subscriber tunes to the first TV channel that is listed on screen 252, the first ordered movie, illustrated by screen 250, appears on television 44. On the other hand, if the subscriber tunes to the second TV channel listed on screen 252, the second ordered movie, illustrated by screen 254, appears on the subscriber's television 44.

The third option in progressing from screen 252 is to select GO BACK with subscriber remote control 46. This returns the subscriber to MAIN MENU screen 236.

Once the subscriber has reached Movie Categories screen 244, the subscriber can either return to MAIN MENU 236 by selecting GO BACK, or can select one of the movie categories listed on screen 244. If the subscriber selects a movie category, UHC 70 determines whether that particular movie category is "locked" to that subscriber. This decision of UHC 70 is shown at decision block 256. A category may be locked, for example, based upon content. In other words, the subscriber may have selected to lock the adult entertainment category so that children would not be allowed to make selections from that category.

If the category selected is not locked, Movie Browser screen 258 is displayed. On Movie Browser screen 258, the movies within the selected category are menued for selection by the subscriber.

Even if the category is locked, it is still possible for the subscriber to reach Movie Browser screen 258 for that category. Screen 260, which is displayed when the category is locked, instructs the subscriber to enter the four-digit PIN. If the subscriber decides to select GO BACK, Movie Category screen 244 will again be displayed. On the other hand, if the subscriber decides to enter the four-digit PIN, the code which has been entered will be compared to the previously stored four-digit PIN.

As shown at decision block 262, if the entered code matches the previously stored four-digit PIN, Movie Browser screen 258 is displayed.

On the other hand, if the entered code does not match the previously stored four-digit code PIN, screen 264 is displayed. This informs the subscriber that the code did not match. The subscriber is allowed two additional tries to enter a matching code. The comparison of the codes by UHC 70 is shown at decision block 266. If the code is entered correctly on either the second or third try, Movie Browser screen 258 is displayed. An incorrect code entry on the second try will return to Code Did Not Match screen 264. A third unsuccessful attempt to enter the correct code results in Access Denied screen 268 being displayed. The only action possible from Access Denied screen 268 is to select GO BACK, which returns the subscriber to MAIN MENU screen 236.

When the subscriber selects a movie off Movie Browser screen 258, UHC 70 first determines whether the selected movie is already running at the subscriber's residence. This is shown at decision box 270. If the movie is already running in this residence, then the subscriber will be given instructions by screen 272 on how to tune back to the channel on which the movie is running. This scenario can occur, for example, where there is more than one television in the same apartment using the system of the present invention. If one of the television sets already is showing the selected movie, the second set can also view the same movie by tuning to the same channel.

Screen 272 instructs the subscriber to either tune to a specified channel to view the previously purchased movie which has just been selected, or press GO BACK in order to return to the Movie Browser screen 258. If the subscriber tunes to the channel listed on screen 274, the previously purchased movie appears, as shown by screen 274.

If the selected movie is not already running at the subscribers residence, UHC 70 then checks to see whether the "buy window" for that movie is open, as shown by decision block 276. The buy window will be open if the movie has not yet started, or if the movie has started but is still within a predetermined time after start. The buy window will typically be a time period of approximately 15 to 30 minutes after the start of the movie. As shown at decision block 276, if the buy window is open, the flow continues downward on line LL to FIG. 4C. If, on the other hand, the buy window is closed, Movie Is Unavailable screen 278 is displayed on television 44. Screen 278 provides the subscriber with a message that the movie that he or she selected is currently in progress and will be available at a specified future time. The subscriber is given only one option, to select "GO BACK", which will return the subscriber to Movie Browser screen 258.

If the buy window is open as determined at decision block 276, the next decision block 278 performed by UHC 70 is shown in FIG. 4C. At decision block 278, UHC 70 determines whether the movie is one which has already started and is to be joined in progress. This is determined by the database maintained by UHC 70 on the current status of all of the video sources 242A–242D. If the movie selected is not already running, then the answer to the join in progress decision block 278 is "NO". UHC 70 then determines whether this is a second movie buy at decision block 280. If the answer is again "NO", then UHC 70 determines whether this particular movie is "locked" at decision block 282.

If the answer at decision block 282 is "NO", ie. the movie is not locked, then Movie Order screen 284 is displayed on television 44. From Movie Order screen 284, the subscriber has two options. By selecting GO BACK, the subscriber is returned (along the line MM) to Movie Browser screen 258 shown in FIG. 4B. If the subscriber selects ORDER MOVIE, Thank You screen 286 appears. Once the movie begins to play, it appears on the screen of television 44, as illustrated in screen 288 in FIG. 4C.

If the selected movie is already in progress when UHC 70 reaches decision block 278, then UHC 70 checks to see whether the movie is locked. This is shown at decision block 290. If the movie is not locked, "Movie In Progress" screen 292 is displayed on television 44. From screen 292, the subscriber can select one of two options. If the subscriber selects GO BACK, the subscriber is returned (along line KK) of Movie Browser screen 258. If the subscriber selects ORDER MOVIE, Thank You screen 294 is displayed on television 44. Thank You Screen 294 instructs the subscriber to tune his or her television to a specified channel—ie. the channel being used by another subscriber to view the selected movie. As part of this process, UHC 70 sends the necessary instructions through interdiction controller 74 to IFU 28 associated with this subscriber to deinterdict the channel listed. When the subscriber tunes television 44 to the channel listed on screen 294, the ordered movie appears.

If the selected movie is in progress and it is locked, then UHC 70 proceeds from decision block 290 to decision block 298. UHC 70 determines whether the selected movie represents a second movie buy by this particular subscriber.

If UHC 70 determines that the selected movie represents a second movie buy, then screen 300 is displayed. Screen 300 informs the subscriber that the movie selected is in progress and indicates the number of minutes elapsed and the number of minutes remaining. The subscriber is also informed that the selected movie is locked and that it represents the second movie for that subscriber. If the subscriber selects GO BACK in response to screen 300, the subscriber has returned over line II to Movie Browser screen 258 in FIG. 4B. Alternatively, if the subscriber selects ORDER MOVIE, screen 302 is displayed, which instructs the subscriber to enter the 4-digit code PIN.

The other path to screen 302 occurs when the selected movie is in progress and is locked, but is not a second movie buy. In that case, UHC 70 proceeds from decision block 298 to screen 304 on television 44. Screen 304 is generally similar to screen 300 in that it indicates that the selected movie is in progress and provides information about the number of minutes elapsed and the number of minutes remaining. Screen 304 also indicates that the selected movie is locked. Since the movie does not represent a second movie buy, screen 304 does not include that information.

From screen 304, the subscriber can select GO BACK or ORDER MOVIE. If the subscriber selects GO BACK, the subscriber is returned as shown by line (JJ) to Movie Browser screen 258. If the subscriber selects ORDER MOVIE, screen 302 is displayed.

There are two paths from screen 302. The subscriber either enters the 4-digit code PIN as instructed by screen 302, or selects CANCEL with subscriber remote control 46.

If the subscriber selects CANCEL in response to screen 302, Order Is Cancelled screen 306 is displayed. The subscriber is informed by screen 306 that the order has been cancelled. The subscriber is given only one option, to select CONTINUE. When that occurs, the subscriber is returned over line HH to Movie Browser screen 258 of FIG. 4B.

If the subscriber decides to enter the 4-digit code PIN in response to screen 302, UHC 70 compares the entered code to the previously stored PIN for that subscriber. This is shown at decision block 308. If the code is correctly entered, Thank You screen 310 is shown on television 44. The subscriber is instructed to tune the television to a specified channel, on which the in-progress movie is already being provided to another subscriber. UHC 70 causes that channel to be deinterdicted by sending instructions through interdiction controller 74 to the IFU 28 associated with the subscriber. When the subscriber tunes television 44 to the channel listed on screen 310, the ordered movie appears, as shown by screen 312.

If the subscriber does not initially enter the correct code, UHC 70 proceeds from decision block 308 by causing Code Did Not Match screen 314 to appear on television 44. Screen 314 gives the subscriber the option to select CANCEL (which leads to screen 306) or to reenter the code PIN. The subscriber is given two more opportunities to enter the correct code PIN, as shown at decision block 316. If the code PIN is entered correctly on either the second or the third try, screen 310 is displayed, and the subscriber is instructed to tune to a channel on which the ordered movie appears. If the code is incorrectly entered on the second try, Code Did Not Match screen 314 is again displayed and the subscriber is given a third opportunity to enter the code PIN, or to select CANCEL and proceed to Order Is Cancelled screen 306.

If the code is incorrectly entered on all three tries, then Access Denied screen 318 is displayed on television 44. The subscriber is given only one option: to select EXIT. When the subscriber selects EXIT, he or she is returned over line GG to MAIN MENU screen 236 of FIG. 4B.

Another path to a movie purchase occurs when the movie is not in progress, but does represent a "2nd Movie Buy" at decision block 280. In that case, UHC 70 then proceeds to decision block 320 (immediately to the left of decision block 280) and determines whether the movie is not locked.

If the movie is not locked at decision block 320, 2nd Movie Buy screen 322 is displayed. The subscriber has two choices. By selecting GO BACK, the subscriber is returned over line KK to Movie Browser screen 258 in FIG. 4B. Selecting ORDER MOVIE, causes Thank You screen 324 to be displayed. As soon as the movie begins, it is displayed on television 44, as indicated by screen 326.

At decision block 320, if the movie is designated as being locked, 2nd Movie Buy/Locked screen 328 is displayed. The subscriber then can select either GO BACK or ORDER MOVIE. If the subscriber selects GO BACK, the subscriber is returned over line KK to Movie Browser screen 258 in FIG. 4B.

If the subscriber selects ORDER MOVIE in response to screen 328, Enter 4-Digit Code screen 330 is displayed. The subscriber is instructed to enter his or her 4-digit code PIN. The subscriber can select CANCEL in response to screen 330 (which returns the subscriber to Order Is Cancelled screen 306) or may begin the sequence of entering the PIN.

As shown in FIG. 4C, there is one other situation in which Enter 4-Digit Code screen 330 is displayed. This occurs when the movie is not in progress and is not a second movie buy, but is locked. Under those circumstances, UHC 70 proceeds from decision block 282 by displaying Locked Movie Screen 332. In response to screen 332, the subscriber can select GO BACK and be returned to over line MM to Movie Browser screen 258 in FIG. 4B, or may select ORDER MOVIE, which leads to screen 330.

When the subscriber enters a 4-digit code PIN, in response to screen 330, UHC 70 compares the entered code to the subscriber's previously stored PIN. This comparison is shown at decision block 334. If the entered code is correct, Thank You screen 336 is displayed. As soon as the movie starts, it appears on television 44, as illustrated by screen 338.

If the code entered is determined to be incorrect at decision block 334, then Code Did Not Match screen 340 is displayed. The subscriber may either cancel the order (CANCEL) or may reenter the code. Selecting CANCEL leads to Order is Cancelled screen 306.

The subscriber may reenter the code PIN two additional times. If the code is entered correctly on either the second or the third try, the path from decision block 342 leads to Thank You screen 336 and then to the ordered movie (screen 338).

If the code PIN is incorrect on the second try, Code Did Not Match screen 340 is again displayed. If the subscriber fails again to enter the correct code PIN on the third try, then Access Denied screen 344 is displayed. The subscriber has only one option: to select EXIT. The subscriber is then returned to over line GG to MAIN MENU screen 236 in FIG. 4B.

This discussion of FIGS. 4A, 4B and 4C shows all of the operations leading to a movie purchase. As part of this process, System Control has been activated. At numerous points within the operation of the system, the subscriber has been required to enter a 4-digit code PIN in order to make a movie purchase.

FIG. 4D illustrates operations relating to System Control. These operations are accessed by the subscriber from MAIN MENU screen 236 of FIG. 4B. When the subscriber selects SYSTEM CONTROL in response to MAIN MENU screen 236, the path proceeds along line FF to FIG. 4D. The subscriber returns from FIG. 4D over line EE back to MAIN MENU screen 236 in FIG. 4B.

When the subscriber selects SYSTEM CONTROL from MAIN MENU screen 236, UHC 70 first determines whether Dispute System Control is active, as shown at decision block 400 in FIG. 4D. If Dispute System Control is not active, UHC 70 then determines whether Subscriber System Control is active at decision block 402. The first scenario to be described is the one in which the answer at decision blocks 400 and 402 is "NO", meaning that neither the Headend System Control nor the Subscriber System Control is active.

The first screen which is displayed during this scenario is System Control Information screen 404. Upon reviewing the information on screen 404, the subscriber then selects the only option, which is continue. System Control Menu screen 406 is then displayed. The subscriber reviews the choices of control options presented on System Control Menu screen 406, chooses the desired control options from the menu, and then selects CONTINUE. Enter 4-Digit Code PIN screen 408 is then displayed. The subscriber can either select GO BACK, which returns the subscriber to System Control Menu screen 406, or may enter a 4-digit code PIN.

When the subscriber enters a 4-digit code PIN, Code Confirmation screen 410 is displayed. The subscriber can either select GO BACK, which returns to System Control Menu screen 406, or reenter the code PIN which he or she just entered.

If the subscriber reenters the code PIN, UHC 70 compares the previously entered code PIN to the code PIN which has just been entered at decision block 412. If the subscriber has correctly reentered the code PIN, System Control Activated screen 414 is displayed. The subscriber then has one choice, which is to select CONTINUE. The subscriber is then returned over line EE to MAIN MENU screen 236 in FIG. 4B.

If the subscriber has failed to correctly reenter the code PIN on the first try, Code Did Not Match screen 416 is displayed, and the subscriber is given two more chances to correctly enter the code PIN. The subscriber can either select GO BACK and return to Enter 4-Digit Code PIN screen 408, or reenter the code PIN.

As shown by decision block 418, a correct entry on either the second or third try results in System Control Activated screen 414 being displayed. An incorrect second try results in Code Did Not Match screen 416 again being displayed. If the third try is unsuccessful, System Control Not Set screen 420 is displayed. The subscriber must then select CONTINUE, which returns the subscriber to System Control Menu screen 406.

The next scenario occurs when the answer at decision block 400 is "YES", meaning that Dispute System Control is active. Change System Control #? screen 422 is displayed, which asks the subscriber whether he or she desires to change the "system control number"—ie. the 4-digit code PIN which the subscriber had entered at some earlier time. The subscriber may either select GO BACK or CONTINUE to progress from Change System Control #? screen 422. If the subscriber selects GO BACK, UHC 70 determines at decision block 424 whether Dispute System Control is active. In this case, since the same inquiry had been answered positively at decision block 400, the subscriber will be returned over line EE to MAIN MENU screen 236 in FIG. 4B.

If the subscriber selects CONTINUE, Enter 4-Digit Code PIN screen 426 is displayed. The subscriber is instructed to enter the existing 4-digit code PIN in order to proceed. The subscriber may either select GO BACK and return to Change System Control #? screen 422, or enter the subscriber's existing code PIN.

At decision block 428, UHC 70 compares the code PIN just entered by the subscriber to the previously stored code PIN for that subscriber. If the code PIN has been correctly entered, Enter New Code screen 430 is displayed. If the code PIN is not correctly entered, the subscriber is given two more tries to enter a matching code, as illustrated by Code Did Not Match screen 432, decision block 434, and No Confirmation screen 436. Code Did Not Match screen 432 is displayed after the first and second incorrect entries. The subscriber can either select GO BACK, and return to Change System Control #? screen 422, or reenter the code.

A correct code entry on either the second or third try leads from decision block 434 to Enter New Code screen 430. An incorrect entry on the second try returns the subscriber to Code Did Not Match screen 432. An incorrect third try results in No Confirmation screen 436. To proceed from No Confirmation screen 436, the subscriber is given only one option, which is select CONTINUE. The subscriber is then returned to Change System Control #? screen 422.

Once the subscriber has reached Enter New Code screen 440, the subscriber may either select GO BACK and return to Change System Control #? screen 422, or enter a new 4-digit code PIN. When the new code PIN has been entered, Code Confirmation screen 438 is displayed. Once again the subscriber can select GO BACK and return to Change System Control #? screen 422. To proceed with the code confirmation, the subscriber reenters the code which was just entered in response to Enter New Code screen 430. UHC 70 compares the reentered code PIN to the new code which was entered in response to Enter New Code screen 430. As shown at decision block 440, a correct code entry results in System Control # Activated screen 442 being displayed. This confirms that the new code PIN which was entered in response to Enter New Code screen 430 has now become the "system control number" or code PIN to be used in the future by the subscriber. The subscriber then selects CONTINUE, and is returned on line EE to MAIN MENU screen 236 in FIG. 4B.

If the user does not correctly reenter the new code PIN in response to screen 438, the subscriber is given two further opportunities to enter a correct code. From decision block 440, an incorrect code entry results in Code Did Not Match screen 444 being displayed. The subscriber can then select GO BACK and return to Change System Control #? screen 422, or reenter the code PIN.

As shown by decision block 446, if the code PIN is reentered correctly on either the second or third try, System Control # Activated screen 442 is displayed. An incorrect second try results in Code Did Not Match screen 444 being displayed again. An incorrect third try results in No Confirmation screen 448 being displayed.

In response to No Confirmation screen 448, the subscriber has only the option of selecting CONTINUE, which will return the subscriber to Enter New Code screen 430. This gives the subscriber another chance to enter a new code PIN and then confirm that new code PIN. Alternatively, the subscriber can then return to Change System Control #? screen 422.

The final System Control scenario occurs when the Headend System Control is not active, but the Subscriber System Control is active. This leads from decision block 402 to System Control Information screen 450. The subscriber is given the option of changing the system control number (ie. the 4-digit code PIN used by that subscriber) or changing System Control options. The subscriber can also select GO BACK and return over line EE to MAIN MENU screen 236 in FIG. 4B.

If the subscriber selects CHANGE NUMBER in response to System Control Information screen 450, Change System Control #? screen 422 is displayed. The subscriber then proceeds with the process of entering and confirming a new four-digit code PIN, which is described above.

In this case, if the subscriber then selects GO BACK in response to Change System Control #? screen 422, decision block 424 will be answered "NO". This is because the same inquiry had been answered "NO" at decision block 400. The subscriber will then be returned to System Control Information screen 450.

If the subscriber selects CHANGE OPTIONS in response to System Control Information screen 450, System Control Menu screen 452 will be displayed. This menu provides the subscriber with a number of control options which can be chosen. Once the subscriber has chosen the desired control options and selects CONTINUE, Enter 4-Digit Code PIN screen 454 will be displayed. The subscriber is instructed to enter his or her four-digit code PIN. If the subscriber selects GO BACK, System Control Menu screen 452 will again be displayed.

If the subscriber enters a four-digit code PIN, that code PIN is compared by UHC 70 to the four-digit code PIN previously stored for that subscriber. UHC 70 compares the entered code PIN to the previously stored code PIN at decision block 456.

If the code PIN has been correctly entered, System Control Activated screen 458 is displayed. The subscriber then selects CONTINUE, and is returned over line EE to MAIN MENU screen 236 in FIG. 4B.

If an incorrect code entry has been made, the subscriber is given two more opportunities to enter a correct code PIN. The first and second incorrect code entries result in Code Did Not Match screen 460 being displayed. The subscriber can then select GO BACK and return to screen 454, or reenter the code.

As shown at decision block 462, a correct code entry on either the second or third try will result in System Control Activated screen 458 being displayed. An incorrect second try causes Code Did Not Match screen 460 being displayed again. A third incorrect try results in Changes Not Sent screen 464 being displayed. The subscriber then selects CONTINUE and is returned over line EE to MAIN MENU screen 236 in FIG. 4B.

If the subscriber has incorrectly entered the code PIN three times after attempting to make control option changes, these changes will not be effected, and the subscriber must again select SYSTEM CONTROL off of MAIN MENU screen 236 in order to have another opportunity at changing the system control options.

5. Conclusion

System 10 of the present invention provides a cost-effective way to deliver services including video-on-demand movies, interactive video games, interactive multimedia services, internet, e-mail and event pay-per-view programming in the context of a multiple dwelling unit application such as an apartment building. The use of interdiction field units 28 allows all signals to be sent from headend 12 over cable 20 in the clear (i.e. without jamming or scrambling). Interdiction field units 28 shorten the homerun cables 30A–30D to the individual apartments, and do not require additional wiring in order to obtain power. Instead, power from power supply 22 is provided through power inserter 24 onto cable 20.

With the present invention, an entire apartment building can be wired to be ready for the full range of services provided by headend 12, even though it is likely that not all tenants of the apartment building will elect to become subscribers. Interdiction field units 28 are capable of turning off the signal entirely over homerun cables 30, so that even if a tenant tries to connect to outlet 40, no signal will be received unless the tenant becomes a subscriber.

An important consideration in the multiple dwelling unit market is the relatively high turnover of tenants. Typically, turnover occurs on average once every year and a half. With the extremely simple subscriber terminal 42 used in system 10, the subscriber can use any television that he or she owns. Subscriber terminal 42 is a low cost unit which, even if not returned by the subscriber at the end of the subscriber's tenancy, will not cause significant economic loss to the cable operator.

The protocol for ordering on-demand movies or other interactive services is accomplished entirely through an interactive session using subscriber remote 46 and display screens which appear on television 44. To purchase the desired service, the subscriber is not required to make any phone calls or take any actions other than to complete the interactive menu session.

Although the present invention has been described with reference to preferred embodiments, workers skilled in the art will recognize that changes may be made in more detail without departing from the spirit and scope of the invention.

What is claimed is:

1. A method of transmitting selected audio/video programs to subscriber units, wherein said transmitting of selected audio video programs involves transmitting audio/video signals and wherein said audio video signals can be in one of two states including an unjammed state wherein an ordinary unmodified television receiver can reproduce said audio/video programs and a jammed state wherein said audio/video signal must be modified before said ordinary unmodified television receiver can reproduce said audio/video program the method comprising:

transmitting audio/video signals on a plurality of channels in a first of said two states from headend circuitry in a headend to an interdiction field unit;

transmitting the audio/video signals on the plurality of channels from the interdiction field unit to each subscriber unit, the interdiction field unit transmitting the audio/video signals in a second of said two states, different from said first state, on selected channels of the plurality of channels as a function of interdiction control data from the headend;

transmitting, from one of the subscriber units to the headend, a signal representative of system data, in response to on-screen menus sent to the subscriber unit from the headend through the interdiction field unit over a channel which is unjammed at least from the interdiction field unit to said one of the subscriber units based on the interdiction control data, said on-screen menus being interactive, including at least a first on-screen menu display;

processing, in said headend circuitry said signal representative of system data;

determining, in said headend circuitry, that a further transmission is to be sent to said subscriber unit, based on said step of processing said signal representative of said system data;

transmitting audio/video signals, by said headend circuitry, independent of an operator determination, based on said steps of processing and determining, for providing a display in said subscriber unit different from said first on-screen menu; and transmitting audio/video signals representing a program selected by the system data from the headend to the interdiction field unit and from the interdiction field unit to the subscriber unit over a channel which is unjammed at least from the interdiction field unit to the subscriber unit based on the interdiction control data.

2. The method of claim 1 and further comprising:

transmitting data from one of the subscriber units to the headend requesting an interactive session;

transmitting data from the headend to the subscriber unit indicating an interactive channel which is available for the interactive session;

displaying at the subscriber unit an indication of the interactive channel which is available;

transmitting interdiction control data to the interdiction field unit associated with the subscriber unit to unjam to that subscriber unit the interactive channel which is available; and transmitting the on-screen menus from the headend to the subscriber unit over the interactive channel.

3. A method of providing programs to a plurality of subscriber units from a headend, the method comprising:

coupling interdiction units between the headend and the subscriber units, each subscriber unit associated with one of the interdiction units, to define transmission paths from said headend to said interdiction field units to said subscriber units;

jamming a plurality of channels along at least a portion of at least some of said transmission paths;

unjamming at least one channel to a specified first subscriber unit;

selecting a program through an interactive session between the headend and the specified first subscriber unit in which on-screen menus are provided to the first subscriber unit from the headend over the channel which is unjammed and commands are sent to the headend from the first subscriber unit;

providing the program selected by a command to the headend from the first subscriber unit over a channel which is unjammed at least from the interdiction field unit to the first subscriber unit so that the selected program can be viewed at the first subscriber unit, wherein said selected program is jammed at least between said interdiction field unit and at least a second subscriber unit.

4. The method of claim 3 and further comprising:

selecting an interactive session at the subscriber unit;

transmitting a command to the headend requesting an interactive session; and transmitting to the subscriber unit an indication of which of the plurality of channels is being unjammed for the interactive session.

5. The method of claim 4 and further comprising:

displaying the indication of which of the plurality of channels is being unjammed so that the subscriber can tune the subscriber unit to that channel.

6. The method of claim 3 and further comprising:

providing an instruction to the subscriber to tune to a channel on which the program selected is being transmitted; and unjamming the channel on which the program is being transmitted so that the program is received without jamming by the subscriber unit.

7. A system for providing user-selected video to users at a plurality of different locations, the system comprising:

a headend which includes:
a video player system having a plurality of outputs;
menu generation means for producing menu display signals;
interdiction control means for producing interdiction control signals;
a host computer for controlling operation of the video player system, the menu generation means and the interdiction control means as a function of program selection signals;
an array of modulators having inputs for receiving outputs from the video player system and the menu generation means and having outputs for providing signals on a plurality of different channels; and
a combiner having an output and having a plurality of inputs for connection to the outputs of the modulators;

a two-way distribution system connected to the headend, the distribution system including interdiction field units, remote from both said headend and from each said location, for selectively jamming and unjamming signals from the headend to specified user systems based upon the interdiction control signals;

a user system at each location which includes:
   a television which operates based upon signals received via the distribution system from the headend;
   a remote control for providing input signals in response to menus which are displayed on the television; and
   a terminal connected to the distribution system sending signals via the distribution system to the headend based upon input signals received from the remote control.

8. The system of claim 7 wherein the terminal includes a display for displaying an indication of an interactive channel to which the user is to tune the television during an interactive session.

9. The system of claim 8 wherein the display displays the indication of an interactive channel in response to data from the headend.

10. The system of claim 7 wherein the host computer controls the interdiction control means as a function of signals received over the distribution system from the terminal.

11. The system of claim 10 wherein, in response to a signal from the terminal requesting an interactive session, the host computer causes the interdiction control means to provide an interdiction control signal which causes the interdiction field unit associated with the terminal to unjam a selected interactive channel.

12. The system of claim 11, wherein the host computer sends a signal to the terminal to cause the terminal to display an indication of the selected interactive channel.

13. The system of claim 11 wherein the host computer causes the menu generation means to produce menu display signals on the selected interactive channel.

14. The system of claim 13 wherein the host computer, in response to signals from the terminal, causes one of the outputs of the video player system to be connected to the input of the modulator for the selected interactive channel.

15. A system for selectively delivering video from a headend to subscriber units, the system comprising:
   a plurality of subscriber units, each subscriber unit including a television, a remote control, and a terminal for receiving signals from the remote control and sending and receiving data;
   an interdiction field unit (IFU) associated with and remote from a plurality of the subscriber units for selectively jamming channels to the subscriber units as a function of interdiction control data;
   said headend being remote from said IFU and including:
      a plurality of video sources including sources of video programs and sources of on-screen menus;
      a plurality of modulators defining channels;
      a switch for selectively connecting video sources to modulators; and
      an interdiction control for providing the interdiction control data and a computer which controls operation of the video sources, the video switch and the interdiction control;
   a transmission medium connected between the headend and the IFU for transmitting audio/visual signals over the channels to the IFU, transmitting interdiction control data to the IFU; and transmitting data to the headend;
   a transmission line between the IFU and each of the subscriber units for transmitting audio/visual signals from the IFU to the subscriber units, with channels being jammed and unjammed based on interdiction control data; and transmitting data from the subscriber unit to the IFU.

16. A method of transmitting selected video programs over transmission paths from a multiplicity of video program sources to at least a first interdiction field unit and from said interdiction field unit to a multiplicity of independently controlled video monitors, wherein said first interdiction field unit is remote from both said multiplicity of video programs and from said multiplicity of independently controlled video monitors, and wherein said transmitting of selected video programs involves transmitting video signals and wherein said video signals can be in one of two states including an unjammed state wherein an ordinary unmodified television receiver can reproduce said video programs and a jammed state wherein said video signal must be modified before said ordinary unmodified television receiver can reproduce said video program, the method comprising:
   transmitting video signals in a first of said two states over a plurality of channels over which a video program can be delivered on said transmission paths;
   selectively unjamming at least one channel over at least the portion of one of said transmission paths from said interdiction field unit to one of said video monitors;
   transmitting a menu to the video monitor over said at least one channel;
   selecting one of the video programs represented by the menu to define a selected video program; and
   transmitting the selected video program over said at least one channel wherein said selected video program is in a second of said two states, different from said first state, between said interdiction field unit and at least one of said plurality of video monitors.

17. A video distribution system for transmitting selected video programs from a headend to a multiplicity of independently controlled video monitors, the system comprising:
   a multiplicity of video monitors;
   a multiplicity of video program sources;
   menu generating means for generating menus that represent video programs;
   program selection means associated with each video monitor for providing, to said headend, a signal selecting a video program from the menu;
   switch means, in said headend, for connecting the menu generating means and for connecting specified ones of the video program sources to specified channels in response to receipt of said signal selecting a video program;
   interdiction control means for providing interdiction control data;
   field interdiction devices associated with the video monitors, each field interdiction device being responsive to interdiction control data to selectively jam and unjam specified channels being delivered to a video monitor with which the field interdiction device is associated; and
   control means coupled to the switch means and the program selection means and the interdiction control means for generating and transmitting corresponding control signals to the switch means and the interdiction control means.

18. A method, as claimed in claim 1, wherein said display, different from said first on-screen menu, includes a second on-screen menu.

19. A method, as claimed in claim 1, wherein said display, different from said first on-screen menu, includes said program selected by the system data.

20. A method, as claimed in claim 1, wherein said on-screen menus sent to the subscriber unit over a channel which is unjammed, is jammed between said headend and at least one other subscriber unit.

21. A method, as claimed in claim 1, wherein said transmitting of system data to the headend is performed in response to polling by said headend.

22. A method, as claimed in claim 1, wherein said first state is said unjammed state.

23. A method, as claimed in claim 16, wherein said first state is said unjammed state.

24. A method of transmitting selected video programs from a multiplicity of video program sources to a multiplicity of independently controlled video monitors, the method comprising:

jamming a plurality of channels over which a video program can be delivered from a video program source to a video monitor;

selectively unjamming one of the channels;

transmitting a menu to the video monitor over the channel which is unjammed;

selecting one of the video programs represented by the menu; and transmitting the video program selected over the channel which is unjammed from said video program source to said video monitor.

* * * * *